(12) United States Patent
Lu et al.

(10) Patent No.: US 10,719,653 B2
(45) Date of Patent: *Jul. 21, 2020

(54) SPINE ROUTING AND PIN GROUPING WITH MULTIPLE MAIN SPINES

(71) Applicant: Synopsys, Inc., Mountain View, CA (US)

(72) Inventors: Chien-Hung Lu, Hsinchu (TW); Chun-Chen Chi, Hsinchu (TW); Tung-Chieh Chen, Hsinchu (TW); Kai-Chih Chi, Hsinchu (TW)

(73) Assignee: SYNOPSYS, INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/654,363

(22) Filed: Jul. 19, 2017

(65) Prior Publication Data
US 2017/0316143 A1 Nov. 2, 2017

Related U.S. Application Data

(63) Continuation-in-part of application No. 14/508,205, filed on Oct. 7, 2014, now Pat. No. 9,747,406.
(Continued)

(51) Int. Cl.
*G06F 30/394* (2020.01)
*G06F 30/00* (2020.01)
(Continued)

(52) U.S. Cl.
CPC ............ *G06F 30/394* (2020.01); *G06F 30/00* (2020.01); *G06F 2111/06* (2020.01); *G06F 2119/10* (2020.01)

(58) Field of Classification Search
CPC ............ G06F 17/5077; G06F 2217/08; G06F 2217/82; G06F 30/394; G06F 2119/10; G06F 2111/06; G06F 30/00
See application file for complete search history.

(56) References Cited

U.S. PATENT DOCUMENTS

| 5,488,088 A | 1/1996 | Wood et al. |
| 5,883,812 A * | 3/1999 | Fujii ................... G06F 17/5077 |
| | | 716/130 |

(Continued)

FOREIGN PATENT DOCUMENTS

WO    WO 15/054536 A1    4/2015

OTHER PUBLICATIONS

U.S. Appl. No. 14/508,205, Final Office Action dated Mar. 10, 2016.
(Continued)

*Primary Examiner* — Nha T Nguyen
(74) *Attorney, Agent, or Firm* — Alston & Bird LLP

(57) ABSTRACT

A computer implemented method of routing a net of an electronic circuit is disclosed. The net connects a plurality of pins of the electronic circuit. The method includes selecting, using one or more computer systems, first and second main spine routing tracks for respective first and second groups of pins of the net. The method also includes generating, using one or more computer systems, a first main spine wire on the selected first main spine routing track and a second main spine wire on the selected second main spine routing track. A router configured to perform the method is also disclosed.

18 Claims, 29 Drawing Sheets

Related U.S. Application Data

(60) Provisional application No. 61/888,932, filed on Oct. 9, 2013.

(51) Int. Cl.
  *G06F 111/06* (2020.01)
  *G06F 119/10* (2020.01)

(56) References Cited

U.S. PATENT DOCUMENTS

| | | | |
|---|---|---|---|
| 7,784,010 B1 | 8/2010 | Balsdon et al. | |
| 7,823,113 B1* | 10/2010 | Waller | G06F 17/5077 |
| | | | 716/100 |
| 8,099,700 B1 | 1/2012 | Waller et al. | |
| 8,935,649 B1 | 1/2015 | Salowe | |
| 8,984,465 B1 | 3/2015 | Salowe | |
| 2001/0009031 A1 | 7/2001 | Nitta et al. | |
| 2005/0229137 A1 | 10/2005 | Ito | |
| 2006/0288323 A1 | 12/2006 | Birch | |
| 2011/0154282 A1 | 6/2011 | Chang et al. | |
| 2012/0137265 A1* | 5/2012 | Chang | G06F 17/5077 |
| | | | 716/131 |
| 2013/0031525 A1* | 1/2013 | Ohtsuka | G06F 17/5072 |
| | | | 716/137 |
| 2013/0086544 A1 | 4/2013 | Alpert et al. | |
| 2014/0033158 A1 | 1/2014 | Chang et al. | |
| 2014/0215426 A1 | 7/2014 | He et al. | |
| 2015/0100938 A1 | 4/2015 | Lu et al. | |

OTHER PUBLICATIONS

U.S. Appl. No. 14/508,205, Non-Final Office Action dated Jun. 4, 2015.
U.S. Appl. No. 14/508,205, Non-Final Office Action dated Sep. 26, 2016.
U.S. Appl. No. 14/508,205, Notice of Allowance dated Apr. 7, 2017.
WIPO Application No. PCT/US2014/059964, PCT International Preliminary Report on Patentability dated Apr. 12, 2016.
WIPO Application No. PCT/US2014/059964, PCT International Search Report and Written Opinion of the International Searching Authority dated Jan. 2, 2015.
U.S. Appl. No. 61/888,932, filed Oct. 9, 2013, Expired.
U.S. Appl. No. 14/508,205, filed Oct. 7, 2014, 2015-0100938, Allowed.
PCT/US2014/059964, Oct. 9, 2014, WO 2015/054536, Expired.

* cited by examiner

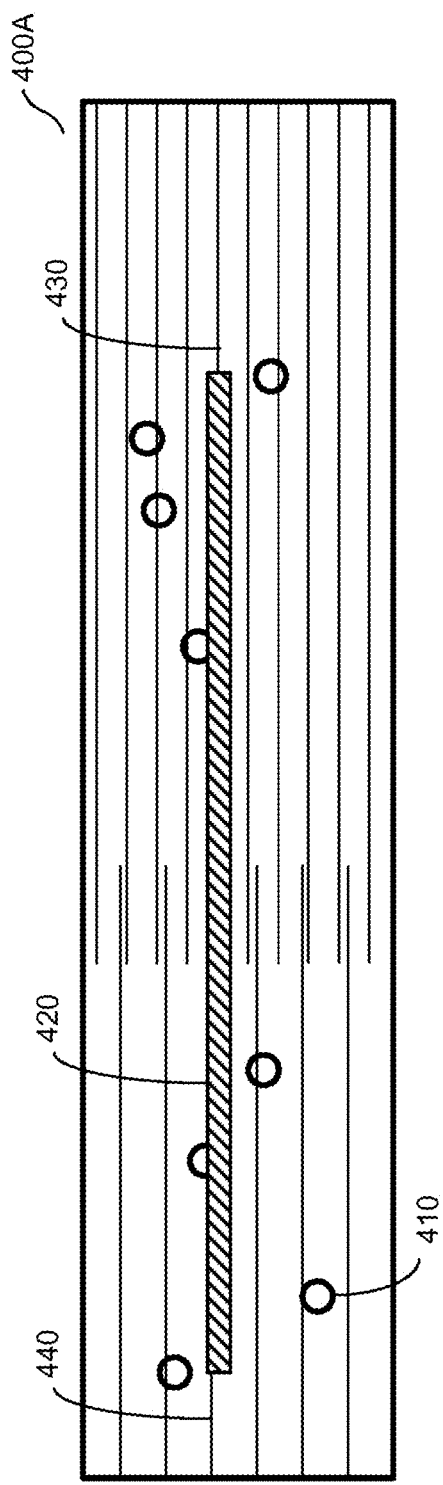
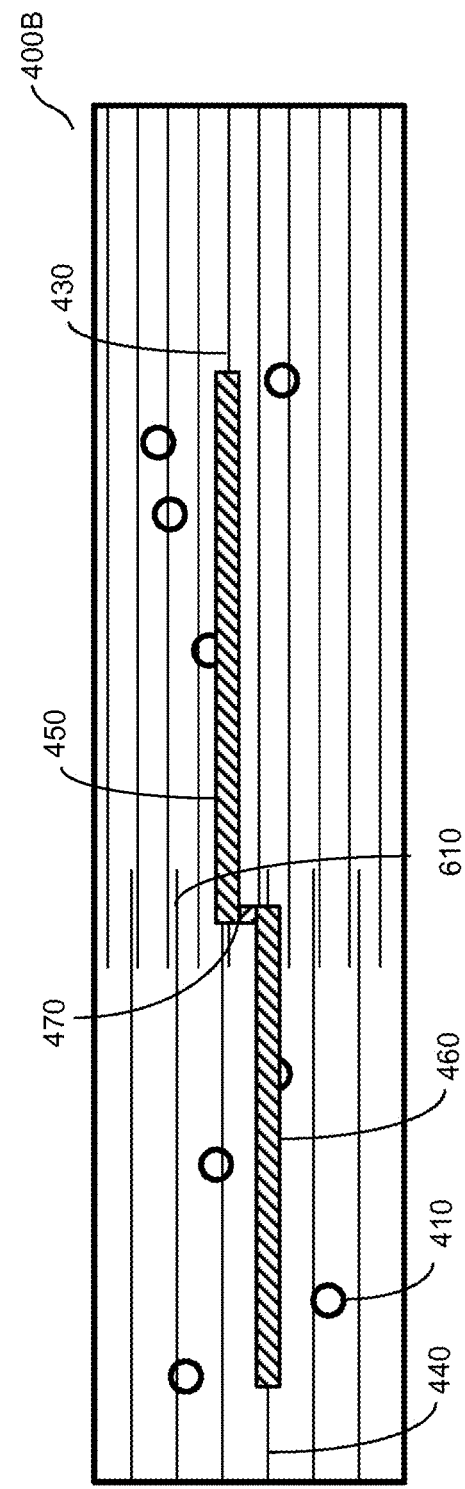

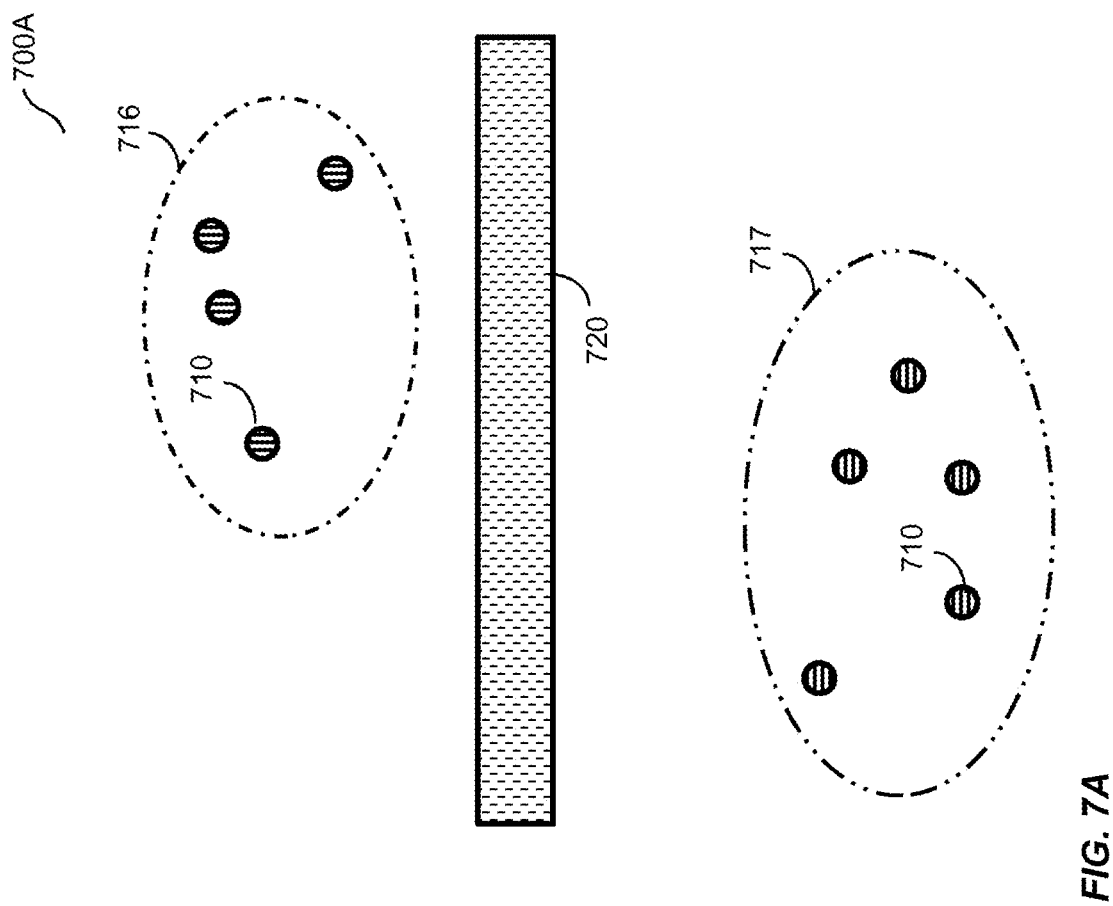
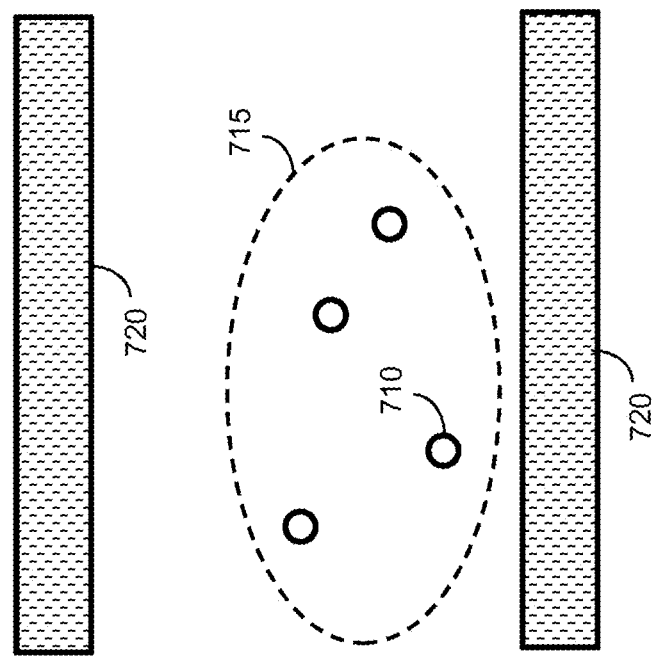
FIG. 7A

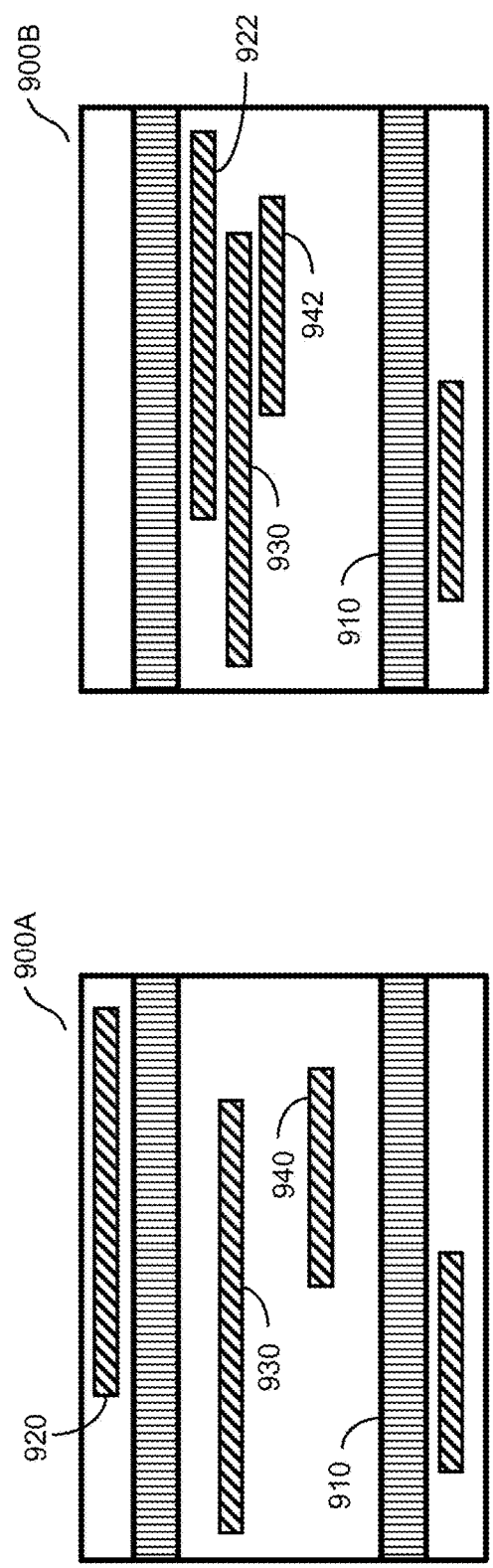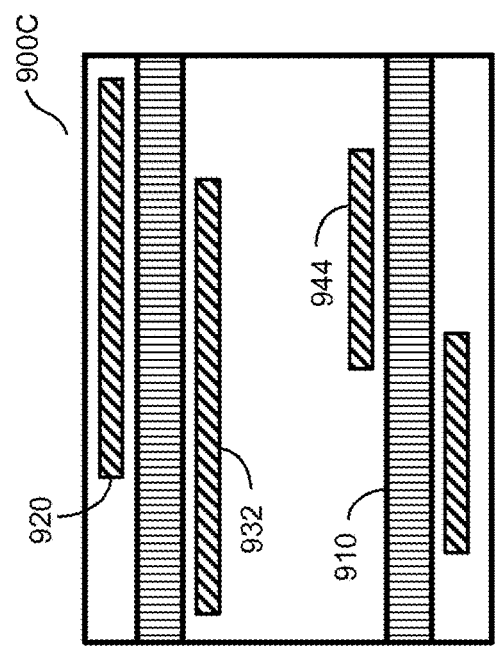

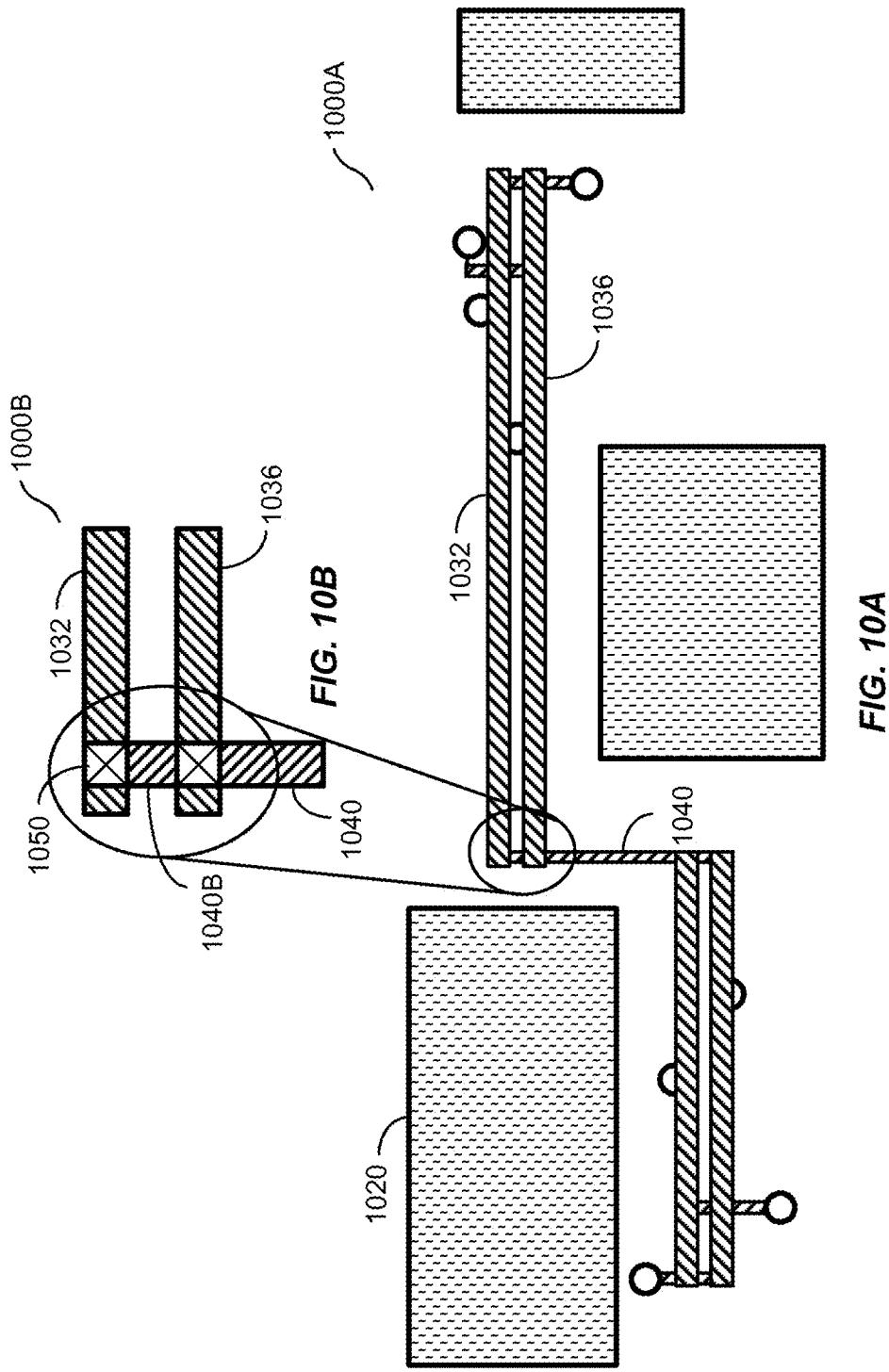

I-pattern

L-pattern

Z-pattern pin access range

SPINE ROUTING AND PIN GROUPING WITH MULTIPLE MAIN SPINES

CROSS-REFERENCES TO RELATED APPLICATIONS

This application is a continuation in part of U.S. patent application Ser. No. 14/508,205 titled "Spine Routing with Multiple Main Spines" filed Oct. 7, 2014, which claims benefit under 35 USC 119 (e) of U.S. provisional Application No. 61/888,932, filed on Oct. 9, 2013, the contents of all of which are incorporated herein by reference in their entirety. The present application is related to commonly assigned U.S. patent application Ser. No. 13/289,965 titled "Multiple Level Spine Routing" filed Nov. 4, 2011, and U.S. patent application Ser. No. 13/289,963 titled "Multiple Level Spine Routing" filed Nov. 4, 2011, both of which claim priority to commonly assigned U.S. Provisional Application No. 61/417,839 filed Nov. 29, 2010, the contents of all of which are incorporated herein by reference in their entirety.

BACKGROUND

The present invention relates generally to a method and system for computer aided design (CAD) of integrated circuits and in particular to finding a flexible way for routing a net.

In electronic circuits, electrical conductors are typically layers of conductive material such as copper or aluminum that are separated by layers of insulating material such as silicon dioxide. The metal layers are patterned using photolithographic techniques to form the conductors for interconnecting electrical elements in an integrated circuit (IC). The design or layout of a complex IC may, in part, be automated such that the location of interconnection wires is determined with the aid of a computer running CAD routing software. The computer is accordingly called a router. In the context of discussions related to the operation of the computer, electronic representations of information corresponding with physical elements are frequently referred to using terms which more generally identify the corresponding physical elements. For example, in the context of discussions related to the operation of the computer, a wire is often an electronic representation of information corresponding to an electrical conductor of an electronic device or a circuit. For example, a wire may be an electronic representation of information representing an electrical conductor within an electronic representation of a circuit design. Based on the electronic representation of the circuit design, a physical circuit may be generated.

SUMMARY OF THE INVENTION

One inventive aspect is a computer implemented method of routing a net of an electronic circuit, where the net connects a plurality of pins of the electronic circuit. The method includes selecting, using one or more computer systems, first and second main spine routing tracks for respective first and second groups of pins of the net. The method also includes generating, using one or more computer systems, a first main spine wire on the selected first main spine routing track and a second main spine wire on the selected second main spine routing track.

Another inventive aspect is a router, configured to route a net of an electronic circuit, where the net connects a plurality of pins of the electronic circuit. The router including a memory including instructions, and a processor configured to execute the instructions, where the instructions cause the computer to perform a method. The method includes selecting, using one or more computer systems, first and second main spine routing tracks for respective first and second groups of pins of the net. The method also includes generating, using one or more computer systems, a first main spine wire on the selected first main spine routing track and a second main spine wire on the selected second main spine routing track.

BRIEF DESCRIPTION OF THE DRAWINGS

Various embodiments of the invention are disclosed in the following detailed description and the accompanying drawings.

FIG. 4A depicts a simplified plan view of a wire routing example using a single main spine wire for routing a net with a misaligned track pattern.

FIG. 4B depicts a simplified plan view of a wire routing example using multiple main spine wires for routing the net depicted in FIG. 4A, in accordance with one embodiment of the present invention.

FIG. 7A depicts a simplified plan view of a wire routing example using multiple main spine wires for routing a net after partitioning pins of the net into groups associated with main spine wires, in accordance with one embodiment of the present invention.

FIG. 9A depicts a simplified plan view of a wire routing example using multiple main spine wires for routing without using compact routing, in accordance with one embodiment of the present invention.

FIG. 9B depicts a simplified plan view of a wire routing example using multiple main spine wires for routing using compact routing, in accordance with one embodiment of the present invention.

FIG. 9C depicts a simplified plan view of a wire routing example using multiple main spine wires for routing using compact routing to a power/ground line, in accordance with one embodiment of the present invention.

FIG. 10A depicts a simplified plan view of a wire routing example using multiple main spine wires for routing a net using loop routing, in accordance with one embodiment of the present invention.

FIG. 10B depicts a portion of the simplified plan view of a wire routing example using multiple main spine wires for routing a net using loop routing depicted in FIG. 10A, in accordance with one embodiment of the present invention.

DETAILED DESCRIPTION

Figure 1:
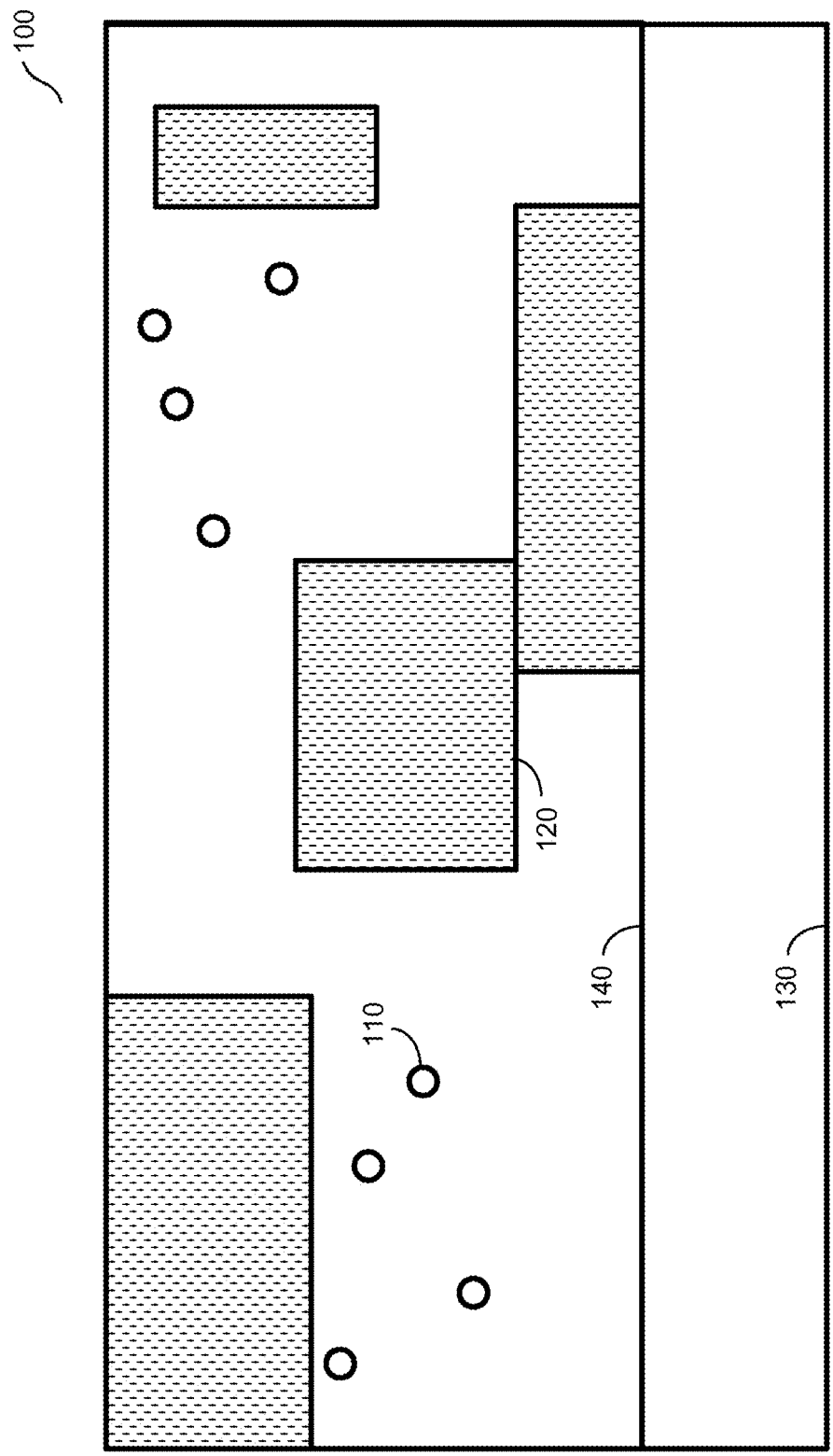
FIG. 1 depicts a simplified plan view of two exemplary net routing problems.

The following examples provide a brief introduction to wire routing. FIG. 1 depicts a simplified plan view of two exemplary net routing problems 100. The first net routing problem includes a multitude of pins 110, a multitude of blockages 120, and a first layout plane 130. The second net routing problem includes the same multitude of pins 110 and multitude of blockages 120, but in contrast includes a second layout plane 140. Solving the two routing problems includes determining the paths for wires between blockages 120 such that each pin of multitude of pins 110 of the net are connected together by wires within either first layout plane 130 or second layout plane 140, respectively.

Wires extending from within a net beyond the layout boundary of the same net may cause problems with routing other adjacent nets. Accordingly, the routing problem posed by first layout plane 130 may be easier to solve than the routing problem posed by second layout plane 140 because second layout plane 140 includes a smaller layout area, which imposes additional routing constraints compared to first layout plane 130, as will be explained below. The area and boundaries of a layout plane, the locations of blockages, and the locations of pins may be included as part of the data or specification of the net for a given IC design and may be positioned in fixed locations before routing, or placed during or as a part of the routing process.

Blockages 120 occur where certain parts of a layout plane may be blocked by wire segments, hereinafter also referred to as "pre-wires", placed in predetermined locations associated with IC components that are fixed in position, for example, by a separate placement process executed before routing, or are placed during or as a part of the routing process. Examples of pre-wires include power and ground lines not arranged in a regular row structure. The blockages on an interconnect layer form a "maze" that the routing process will avoid or route around when routing that interconnect layer.

Various techniques and styles exist for routing an integrated circuit design. Spine routing, also known as fishbone routing, provides many advantages over other routing techniques. For example, spine routing can reduce vias and jogs on interconnects and can result in better routing quality in terms of factors such as timing delay and signal integrity.

Figure 2:
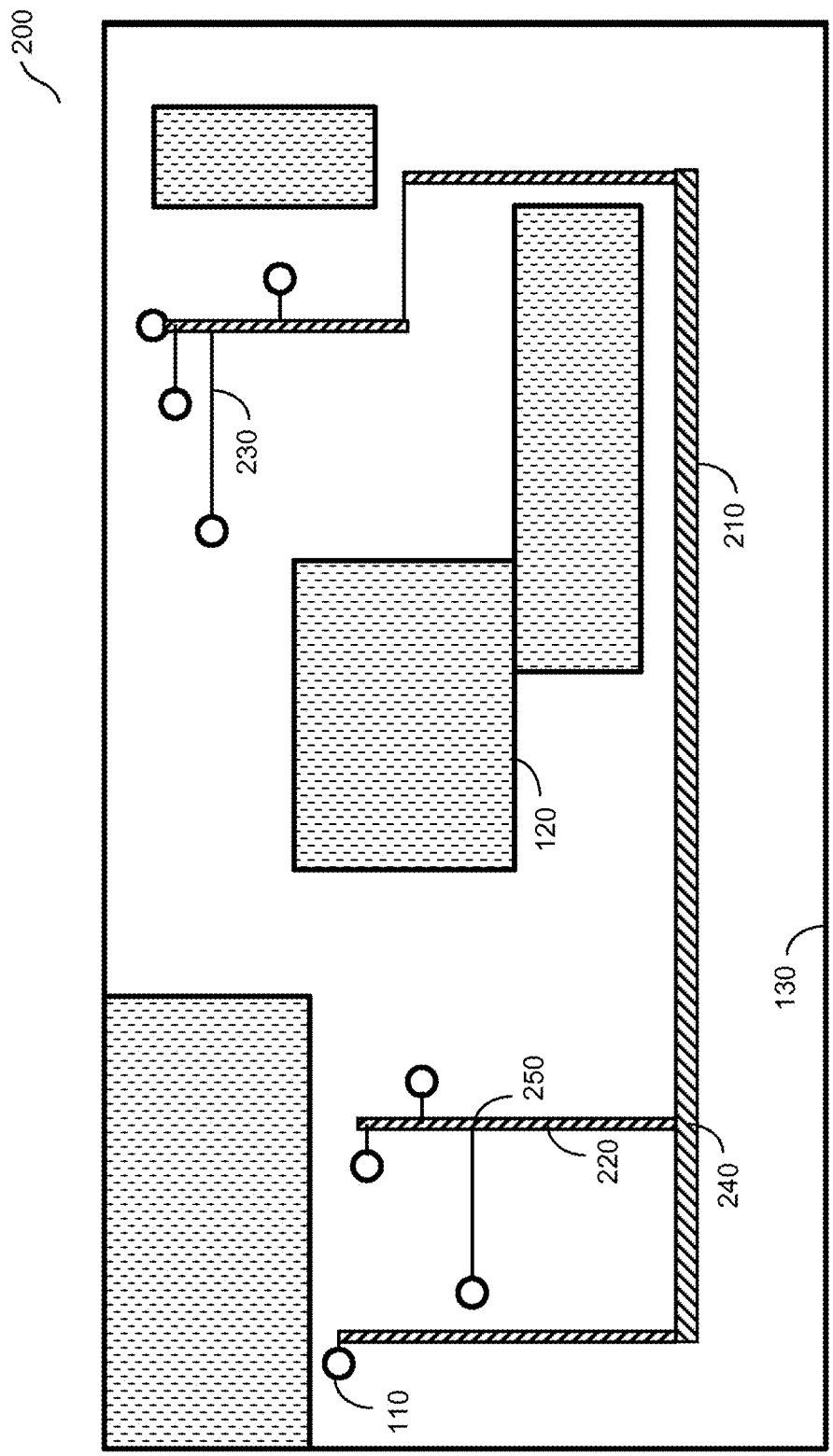
FIG. 2 depicts a simplified plan view of a wire routing example using a single main spine wire for one of the exemplary routing problems depicted in FIG. 1.

FIG. 2 depicts a simplified plan view 200 of a wire routing example 200 using a single main spine wire 210, hereinafter also referred to as "main spine," for the first net routing problem of plane 130 in FIG. 1. The wire routing connects each pin of the multitude of pins 110 of the net together. The wire routing includes a single main spine 210, a multitude of branch spines 220, and a multitude of wires 230. For example, single main spine 210 may be formed on a patterned metal two layer, hereinafter also referred to as "M2", which may be a horizontal routing layer. The multitude of branch spines 220 may be formed on a patterned metal one layer, hereinafter also referred to as "M1", which may be a vertical routing layer that underlies the M2 layer on the IC. The multitude of wires 230 may be formed on M2. Similar fill code patterns in the figures denote the same metal layer.

It is understood that M2 has been assigned as a horizontal routing layer by way of example and could, alternatively, be assigned as a vertical routing layer. Although in some of the provided examples horizontal and/or vertical routing of spines is described, the techniques disclosed herein may be similarly employed for any other spine orientations. Adjacent metal layers such as M1 and M2 are commonly assigned to substantially orthogonal routing layers. Although the figures show just two metal layers by way of example, the embodiments of the present invention may be applicable to an arbitrary number of wire layers. For example, single main spine 210 may be formed on a metal three layer (M3), the multitude of branch spines 220 may be formed on M2, and the multitude of wires 230 may be formed on M1.

There may be conductive vias connecting different metal layers, for example at an intersection of a M1 wire and M2 wire such as at locations 240 and 250 to complete the electrical continuity of the electrical path between each of the multitude of pins of the net. However, for better clarity, the conductive vias are not shown in the figures but are understood to be present. A circle symbolically denotes a pin of the multitude of pins 110, which may be one end point of the net. Typically, each pin represents a connection point to an electrical component of the IC design. Generally, a net associated with an integrated circuit design includes a wiring connection that carries a signal from a driving pin to receiving pins. A net, hereinafter also referred to as a "path," includes any combination of electrically connected wire segments such as single main spine 210, the multitude of branch spines 220, and the multitude of wires 230 that electrically connect pins of the net using only wires or vias to make the electrical connection. In other words, a single net is schematically represented by a single electrical node in a schematic drawing.

Nets may also include patterned polysilicon or single-crystal-diffusion wire segments that are commonly overlaid with a refractory metal layer to reduce resistivity. In other words, a net or path is a continuous electrical connection of metal wires and metal vias that is unbroken by any other passive or active components such as resistors, capacitors, transistors, or the like. For example, a resistor may have a resistivity per unit length that is at least an order of magnitude higher than that of any portion of a net. In another example, first and second nets may be separated by a transistor having a drain connected to the first net and a source connected to the second net. However, it is understood that nets may have distributed electrical attributes such as parasitic resistance and capacitance, which are usually undesired and become larger for longer paths. Thus, when routing a net a shorter length is more desirable than a longer length.

Potential locations for wires may be in predetermined tracks separated by a spacing specified by design rules for a given process technology and fabrication facility. The data representing track locations may be part of the specification of the net. Thus, the locations of wires are constrained to the tracks that for a given layer. For example, M2 may only run in one direction, e.g. horizontal or vertical. The figures may depict a wire as a long rectangular shape or alternatively as a simplified symbolic line segment with a longitudinal axis typically placed or generated by the routing process in the centerline of an available track and spaced away from a blockage by a spacing design rule.

The routing process may be constrained because the locations of the blockages and pin locations may typically be fixed prior to routing. For the example depicted in FIG. 2 using first layout plane 130, it is noted that the multitude of pins 110 of the net fall generally into two regions that are separated by blockages 120 such that solutions to link the two regions of pins via a single main spine wire having a horizontal longitudinal direction are constrained to the region below blockages 120. Further, because the single main spine is positioned relatively far from the two groups of pins, the total length of the net is relatively large. However, referring to FIGS. 1 and 2, a single main spine wire solution would be difficult for the routing problem as constrained by second layout plane 140, which is coincident with the lower border of blockages 120 and thereby may prevent single main spine wire routing solutions.

Figure 3:
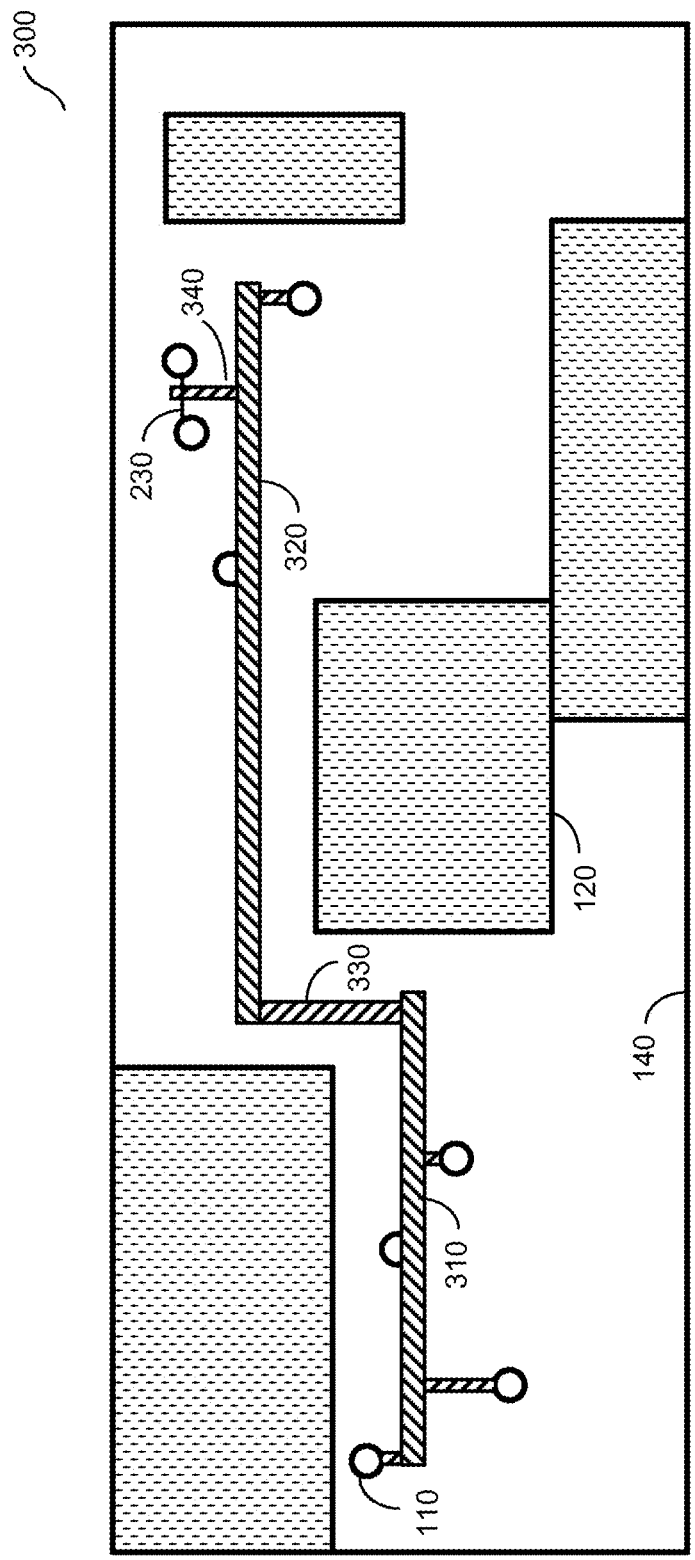
FIG. 3 depicts a simplified plan view of a wire routing example using multiple main spine wires for another one of the exemplary routing problems depicted in FIG. 1, in accordance with one embodiment of the present invention.

FIG. 3 depicts a simplified plan view of a wire routing example 300 using multiple main spines 310, 320 for the second routing problem of FIG. 1, and which includes second layout plane 140. FIG. 3 depicts similar features as FIG. 2 with the following exceptions being noted. FIG. 3 depicts a wire routing including a first main spine 310, a second main spine 320, a main branch spine 330, a multitude of branch spines 340, and a multitude of wires 230. Main branch spine 330 directly connects first main spine 310 to a second main spine 320.

Although the second layout plane 140 provides less routing area than first layout plane 130, an advantageous routing solution is obtained by using a multitude of main spine wires that are oriented both horizontally and vertically. Thus, the use of multiple main spine wires, according to embodiments of the present invention, provides greater flexibility in obtaining routing solutions for certain situations where preexisting constraints may make a single main spine routing solution less desirable or impossible due to lack of available main spine tracks. As shown by comparing the routing results of FIGS. 2 and 3, the total length of the net may be reduced by using multiple main spine routing, thereby improving circuit performance by reducing unwanted parasitic capacitance and/or resistance of the net. Reducing the length of the net may also free up routing tracks, which consequently may be made available to route other nets, saving routing resources and potentially reducing chip size and cost. These advantages of multiple main spine routing are greater when the net extends for a longer distance.

In one embodiment, pins that are horizontally spaced apart by more than a predetermined distance may connect directly to the branch spines 340. In some embodiments, pins that are horizontally spaced apart by less than a predetermined distance connect directly to one of the multitude of wires 230, which connect the pins to one of the multitude of branch spines 340.

FIG. 4A depicts a simplified plan view of a wire routing example 400A using a single main spine wire 420 for routing a net with a misaligned track pattern. Example 400A includes first and second multitudes of regularly spaced horizontal tracks 430, 440. The leftmost ends of the first multitude of regularly spaced horizontal tracks 430 overlap with the rightmost ends of the second multitude of regularly spaced horizontal tracks 440. However, the pitch of the first multitude of regularly spaced horizontal tracks 430 is different than the pitch of the second multitude of regularly spaced horizontal tracks 440. Accordingly, single main spine wire 420 may be placed so as to be properly centered longitudinally on one track of the first multitude of regularly spaced horizontal tracks 430 but not on one of the tracks of the second multitude of regularly spaced horizontal tracks 440.

FIG. 4B depicts a simplified plan view of a wire routing example 400B using multiple main spine wires 450, 460 for routing a net to the pins depicted in FIG. 4A, in accordance with one embodiment of the present invention. In example 400B, the net is routed using multiple main spines 450, 460, where each main spine is placed so as to be properly centered on one of the first and second multitude of regularly spaced horizontal tracks 430, 440. In addition, main spines 450 and 460 are connected by main branch spine 470.

Figure 5:
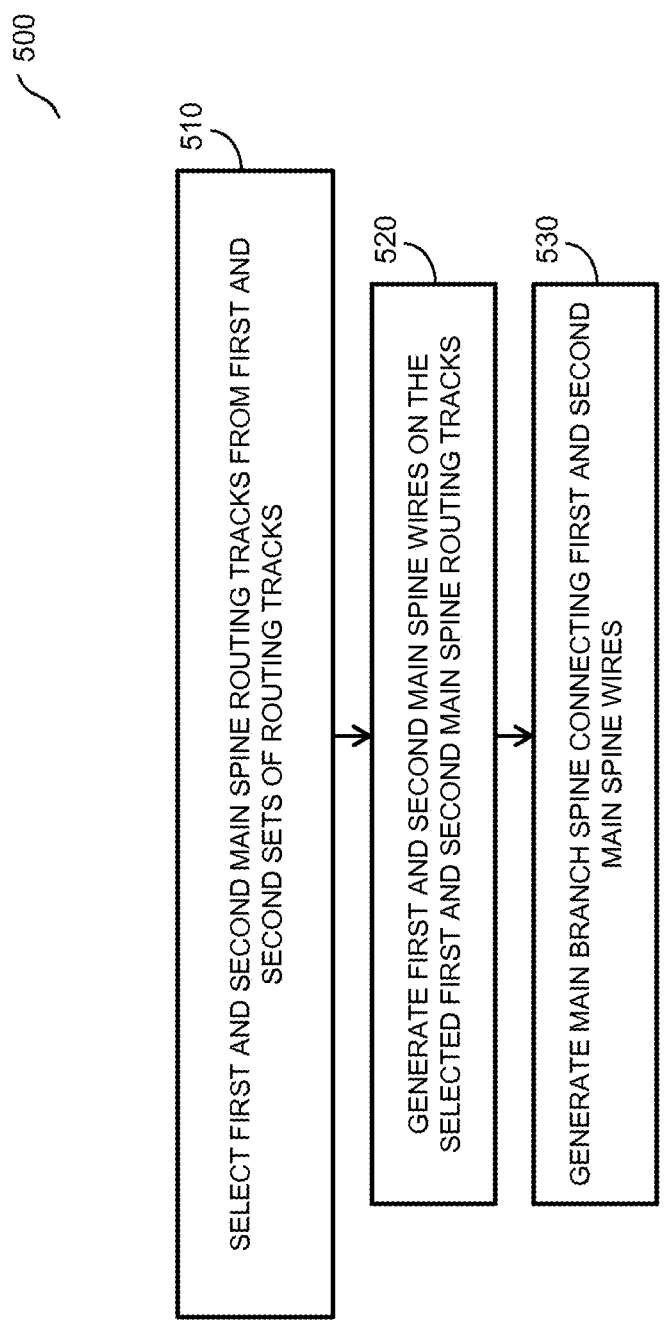
FIG. 5 depicts a first simplified flow chart for routing a net using multiple main spine wires, in accordance with one embodiment of the present invention.

FIG. 5 depicts a first simplified flow chart 500 of an embodiment of routing a net having multiple pins using multiple main spine wires. Referring to FIGS. 3 and 5, the computer selects 510, using one or more computer systems, a first spine routing track from a first set of preexisting selectable routing tracks for a first group of the multitude of pins, and selecting a second spine routing track from a second set of preexisting selectable routing tracks for a second group of the multitude of pins.

In some embodiments, the multitude of pins are partitioned into groups based on their location, for example, as discussed in more detail elsewhere herein. In some embodiments, each of the groups of pins are associated with a set of selectable routing tracks based on their location, for example, as discussed in more detail elsewhere herein.

The first and second spine routing tracks are selected in accordance with a first cost function and further in accordance with data associated with the net and the first and second multitudes of routing tracks. The data may include the positions of each of the pins of the net and each of the available routing tracks of the first and second multitudes of routing tracks for the net, for a given IC design. The computer implemented method may further include generating 520 a first spine wire 310 on the selected first spine routing track and a second spine wire 320 on the selected second spine routing track.

In some embodiments, the method also includes generating 530 a main branch spine 470 which first spine wire 310 and second spine wire 320.

In one embodiment, the first cost function may include a wire length of a portion of the net or of the total net wire length. In another embodiment, the first cost function may include a count of the number of vias of the net and/or other cost functions described below.

Figure 6:
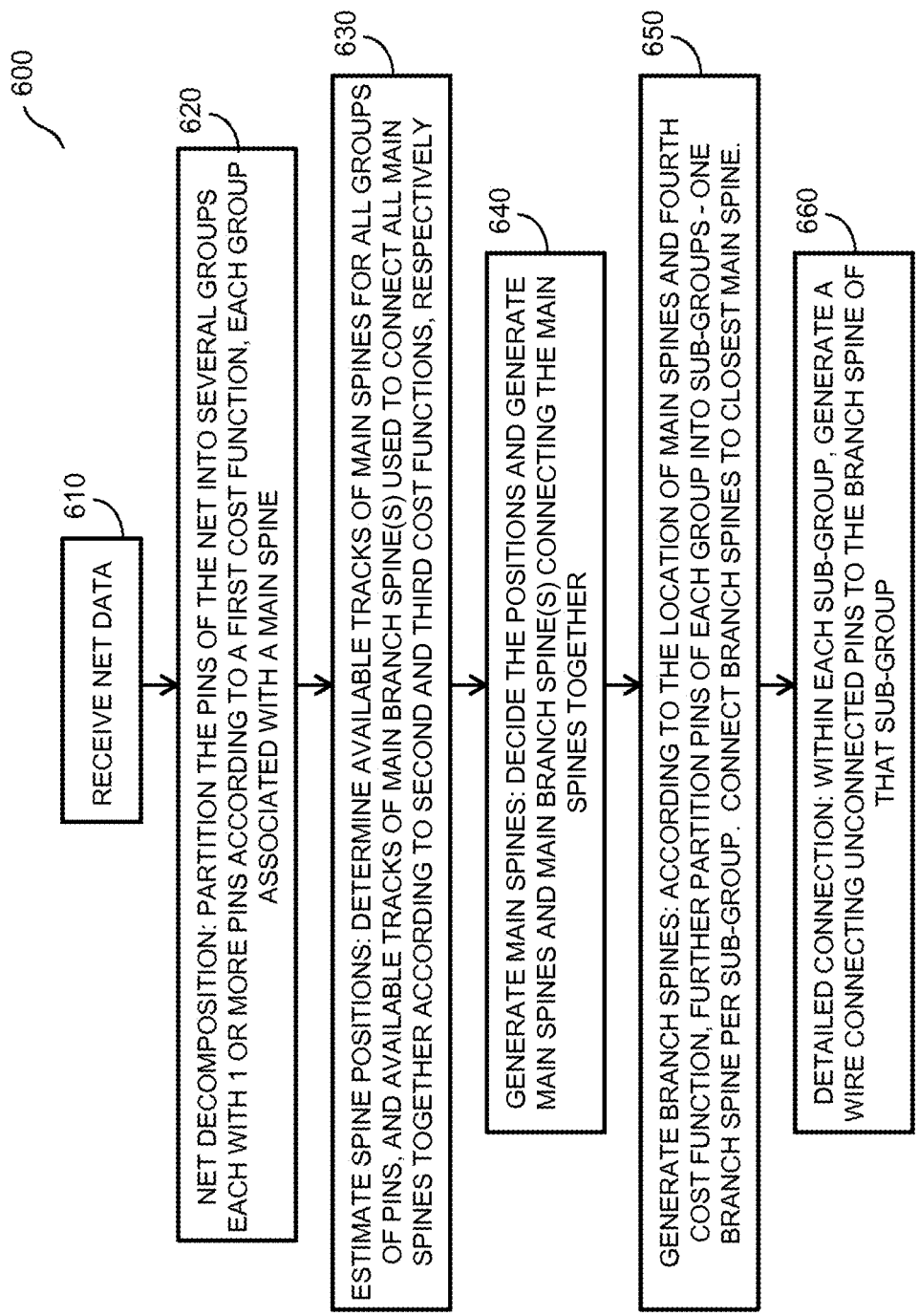
FIG. 6 depicts a second simplified flow chart for routing a net using multiple main spine wires, in accordance with one embodiment of the present invention.

FIG. 6 depicts a second simplified flow chart 600 for routing a net using multiple main spine wires, in accordance with one embodiment of the present invention. The data associated with the net and the first and second multitude of routing tracks is received 610 for the routing process. The data received may include locations of pins, blockages, and selectable tracks available for wire placement for the net. Routing an entire integrated circuit generally includes routing a large number of nets.

FIG. 7A depicts a simplified plan view of a wire routing example 700A using multiple main spine wires for routing a net after partitioning 620 a multitude of pins 710 associated with the net into a multitude of groups 715, 716, 717, in accordance with one embodiment of the present invention. Referring to FIGS. 6 and 7A, each group of the multitude of groups 715, 716, 717 includes one or more pins. Wire routing example 700A includes a multitude of blockages 720 similar to blockage 120 depicted in FIG. 1. The multitude of pins 710 are depicted as small circles. Pins 710 within the same group are depicted with the same fill pattern different than the fill pattern of pins 710 in other groups. Each one of the multitude of groups 715, 716, 717 may be associated with a different one of the multitude of main spine wires, as will be discussed below.

In this embodiment, the method includes partitioning 620 the pins 710 associated with the net into at least a first and a second group of pins. In this embodiment, first group of pins 715 may be associated with the main spine routing track to be selected as the first main spine routing track, second group of pins 716 may be associated with the main spine routing track to be selected later as the second main spine routing track, and third group of pins 717 may be associated with the main spine routing track to be selected later as the third main spine routing track. It is understood that the multitude of pins 710 may be decomposed or partitioned into a multitude of groups corresponding to different ones of a multitude of main spine wires, and that the three groups of pins corresponding to the first, second, and third second main spine wires are an example and do not limit the scope of the present invention. Partitioning 620 may be done in accordance with a second cost function. In one embodiment, the first cost function includes the second cost function. In one embodiment, the second cost function includes a wire length. In one embodiment, the second cost function includes a rule associated with a constraint, which will be discussed below.

Partitioning may be performed by a pin grouping process that determines how pins should be grouped inside a net. The pin grouping process may take several factors into consideration including: pin access range, blockages in the design, and total wire length allowed inside and outside of the net. The pin grouping process may be used in a row-based design or a row-less-based design. A row may be defined as an area in the net that is reserved for standard-cell placement. In a row-based design, there are cells placed in the rows. However, in a row-less-based design there are no row areas defined in the design and cells may be placed anywhere on the design.

The pin grouping process may also consider one or more of the following constraints for determining pin grouping. One row one spine constraint, where the pins on the same row share the same spine. The one row one spine constraint can only be implemented in row-based designs. Two rows one spine constrain, where the pins on two adjacent rows share the same spine. Like the one row one spine constraint the two rows one spine constraint can only be implemented in row-based designs. Grouping distance constraint, which puts a limitation on the distance of the grouping of pins. Length limit constraint which implements a maximum length allowed for wiring in a pin layer for pin connection.

Figure 15:
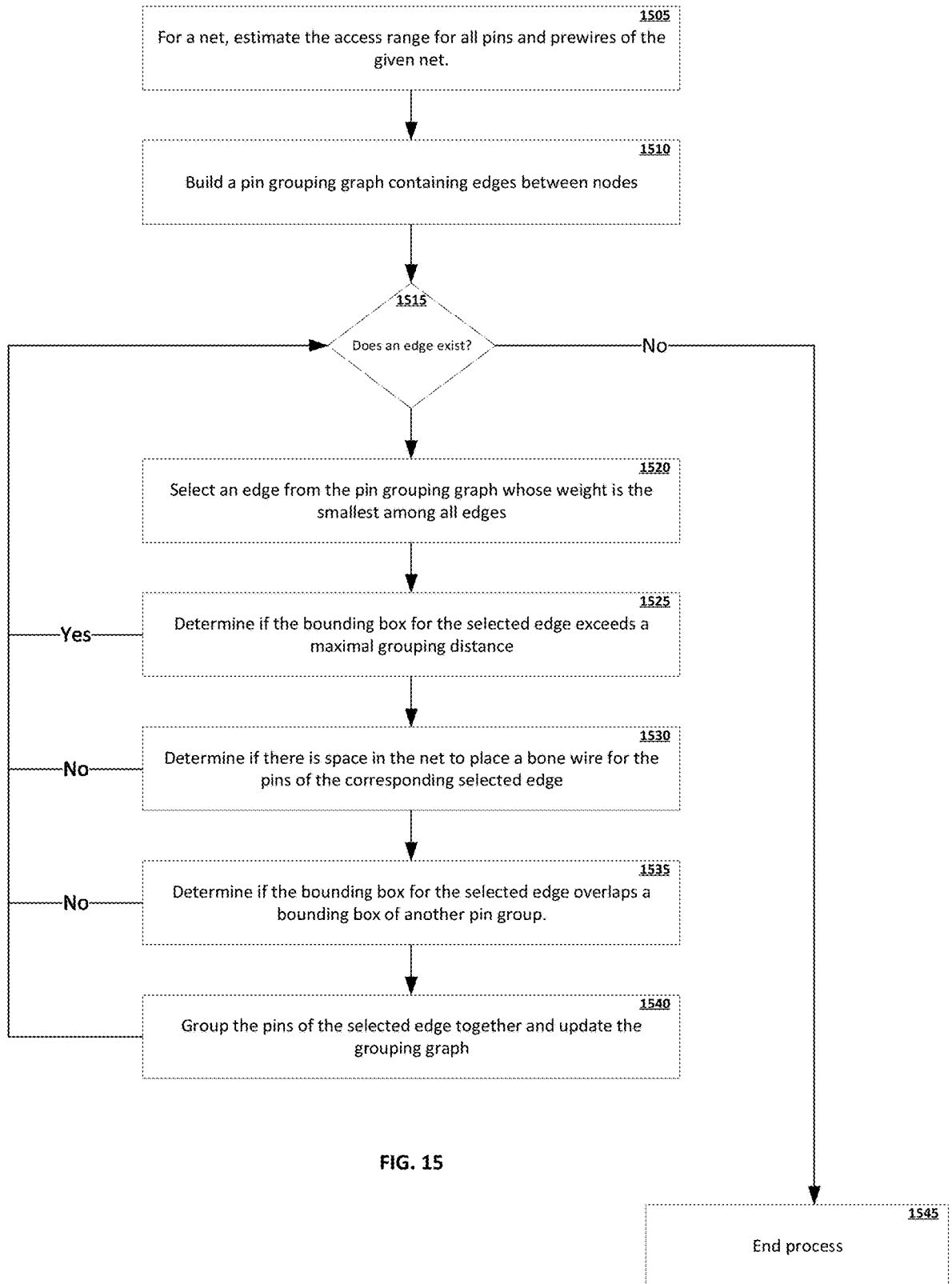
FIG. 15 depicts a second simplified flow chart for grouping one or more pins, in accordance with one or more embodiments of the present invention.
Figure 16A:
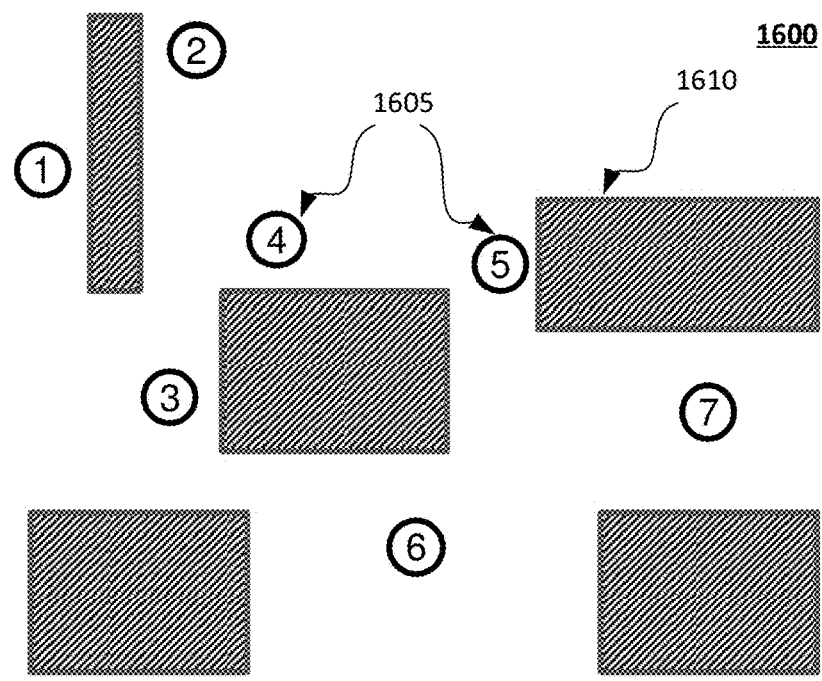
FIG. 16A depicts a simplified plan view of a pin grouping process for a net, in accordance with one or more embodiments of the present invention.
Figure 16B:
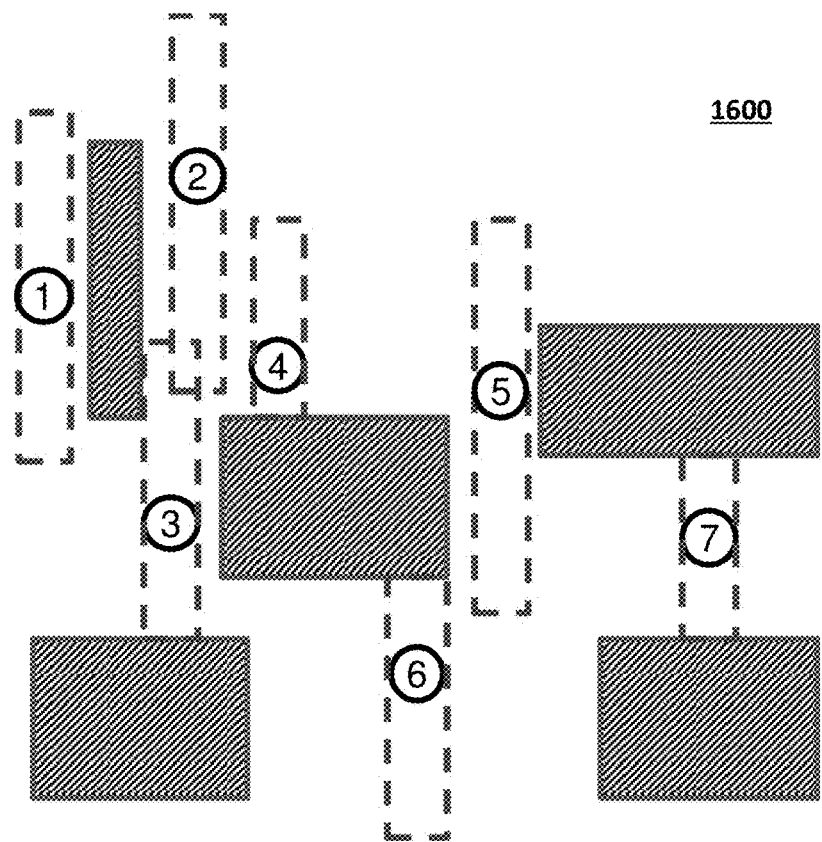
FIG. 16B depicts a simplified plan view of a pin grouping process for a net, in accordance with one or more embodiments of the present invention.
Figure 22A:
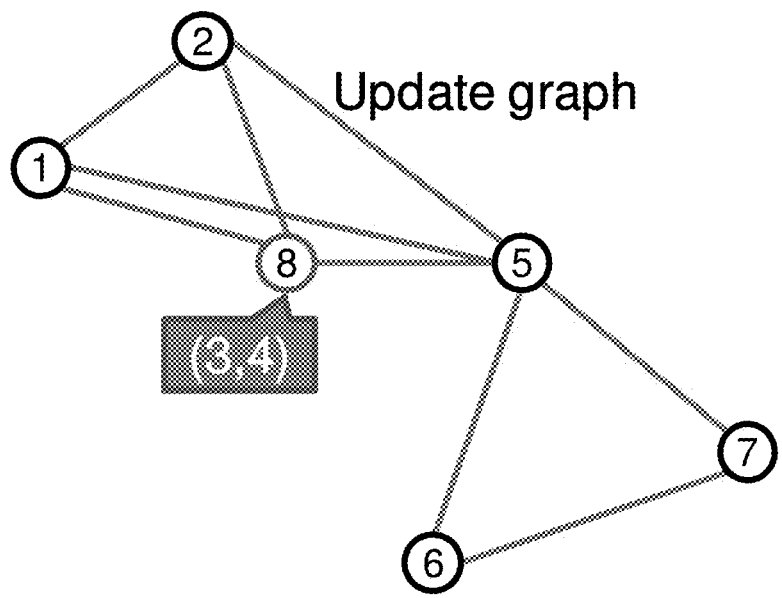
FIG. 22A depicts an exemplary embodiment of a grouping graph, in accordance with one or more embodiments of the present invention.
Figure 22B:
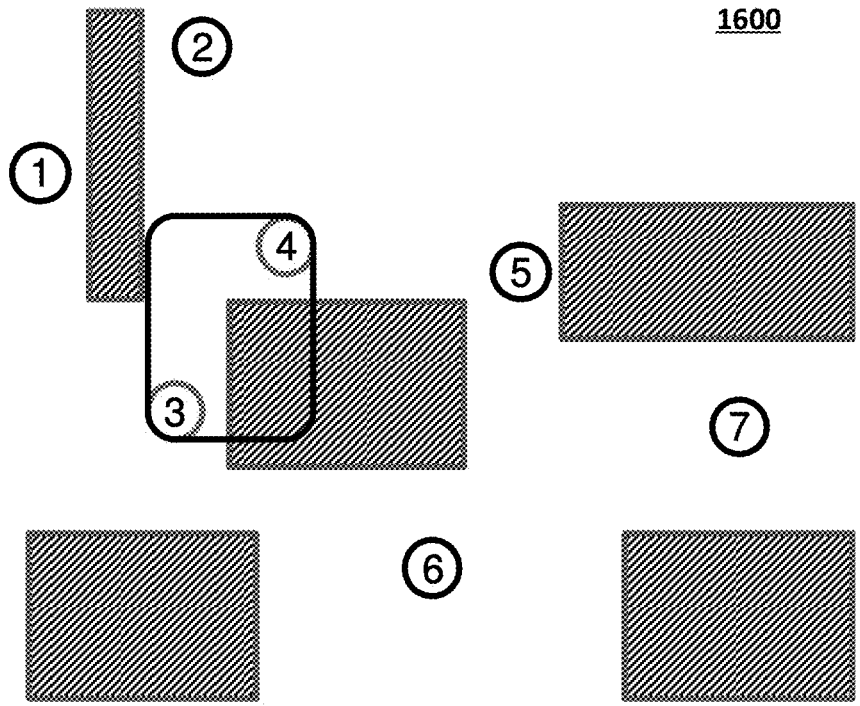
FIG. 22B depicts a simplified plan view of a pin grouping process for a net, in accordance with one or more embodiments of the present invention.
Figure 23A:
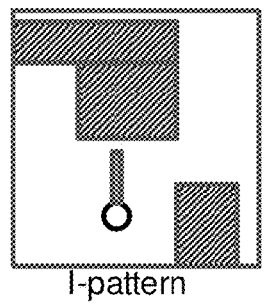
FIG. 23A depicts a simplified plan view of a pin grouping process for a net, in accordance with one or more embodiments of the present invention.
Figure 23B:
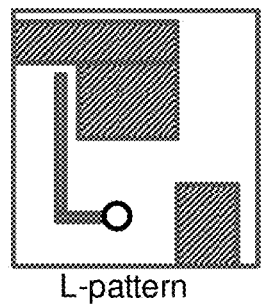
FIG. 23B depicts a simplified plan view of a pin grouping process for a net, in accordance with one or more embodiments of the present invention.
Figure 23C:
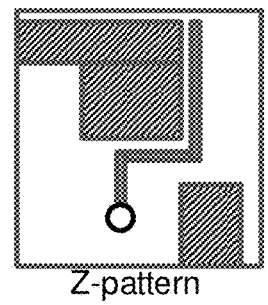
FIG. 23C depicts a simplified plan view of a pin grouping process for a net, in accordance with one or more embodiments of the present invention.
Figure 23D:
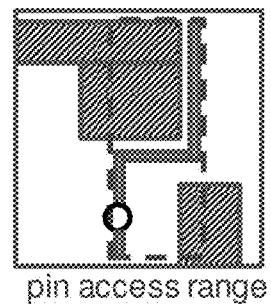
FIG. 23D depicts a simplified plan view of a pin grouping process for a net, in accordance with one or more embodiments of the present invention.

FIG. 15, illustrates an exemplary process for determining pin grouping in a net. For ease of understanding some of the steps disclosed in FIG. 15 will be explained in conjunction with FIGS. 16-23E. At step 1505, the access range for all pins and prewires for a given net is determined. FIG. 16A illustrates net 1600. Net 1600 comprises several pins 1605 and several blockages 1610. FIG. 16B illustrates net 1600 with estimated access ranges (i.e. the dotted lines) for pins 1-7. The method to estimate the access ranges of pins will be detailed in relation to FIGS. 23A-23D. The pin access range may be determined by using a combination of pattern routes to determine the range, in a certain direction, that a pin can have design rule check (DRC) clean routing. Typical pattern routes include an I-pattern, L-pattern, and Z-pattern. These 3 patterns are displayed in 23A, 23B and 23C respectively. Each pattern is used to determine the farthest access range in a preferred direction. The pin access range may be determined by the sum of all of the patterns. For example FIG. 23D is the pin access range from the I-pattern, L-pattern, and Z-pattern from FIGS. 23A, 23B, and 23C. In embodiments, the pin access range relates to the pin access to a bone wire. In other embodiments, the pin access range relates the pin access to a spine wire. In some embodiments, only one pattern route may be used to determine the pin access range. For example, the pin access range may be determined solely from the Z-pattern as shown in FIG. 23C. In alternate embodiments, any type or combination of routing patterns may be used to determine pin access range.

Figure 23E:
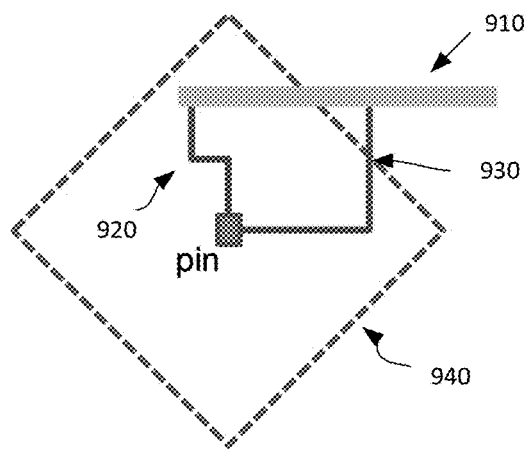
FIG. 23E depicts a simplified plan view of a pin grouping process for a net, in accordance with one or more embodiments of the present invention.

The access range of a pin may be limited by a wire length limit as shown in FIG. 23E. In FIG. 23E, a pin is to be connected to bone wire 910, but there is a maximum wire length of 10 micrometers as indicated by range box 940. Z-pattern wire 920 and L-pattern wire 930 are two potential wire connections. Z-pattern wire 920 is a valid connection as it is within range box 940. However, L-pattern wire 930 is not a valid connection as it is not within range box 940. As a result, in this embodiment, when determining the access range for the pin only Z-pattern wire 920 will be considered.

Figure 17:
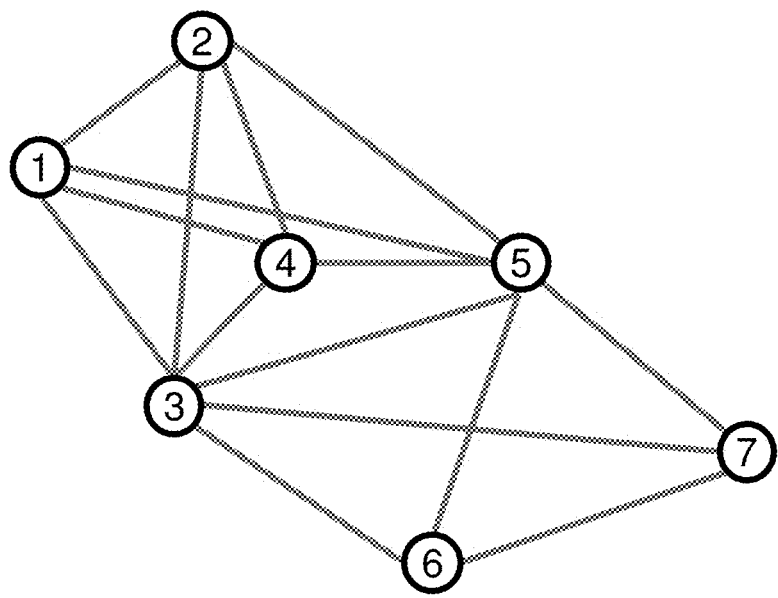
FIG. 17 depicts an exemplary embodiment of a grouping graph, in accordance with one or more embodiments of the present invention.
Figure 24:
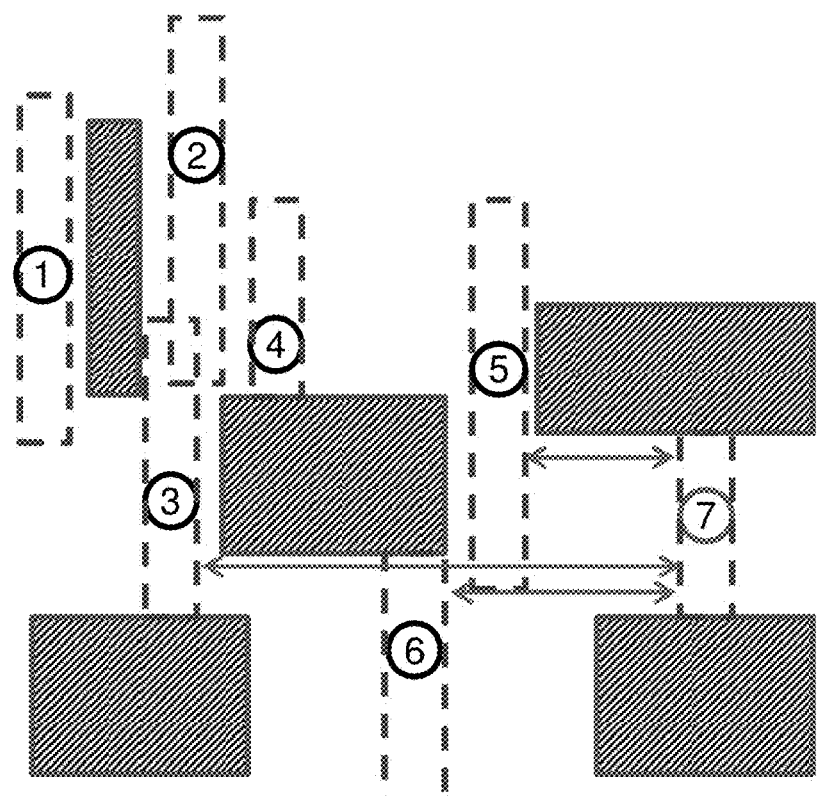
FIG. 24 depicts an exemplary embodiment of determining an edge, in accordance with one or more embodiments of the present invention.

At step 1510, a pin grouping graph is constructed containing nodes and edges. The nodes represent pins or groups of pins, and the edges represent potential connections between nodes. FIG. 17 illustrates grouping graph 1700, which corresponds to net 1600. An edge $e_{ij}$ is then created between two nodes i and j if their access ranges are overlapped in spine direction. With reference to FIG. 24, taking pin 7 as an example it can be seen that an edge can be created between pins 7 and 5, 7 and 6, and 7 and 3 because a horizontal spine can be placed inside all of their access ranges. Taking pin 2 as an example it can be seen that an edge can be created between pin 2 and 1, if a horizontal spine wire were to be placed slightly above the obstacle separating the access ranges of pins 1 and 2. In addition a main wire could be created between pins 2 and 3, 2 and 4, and 2 and 5. As previously detailed a main spine wire may run vertical or horizontal. Now with reference to FIG. 17, when an edge is created for two nodes a line connecting those two nodes is created on grouping graph 1700. Once an edge has been created for every two nodes that have overlapped access ranges, weights are assigned to the edges according to the distance between the two nodes of the edge. For example, edge $e_{12}$ in grouping graph 1700 is assigned a weight based on the distance between node 1 and 2, and edge $e_{25}$ is assigned a weight based on the distance between node 2 and 5. In other embodiments, the weight assigned to the edges may be determined by considering the distance along with the previously mentioned constraints (e.g. one row one spine constraint).

At step 1515, the grouping graph is analyzed to determine if there are any remaining edges. If there are remaining edges then the process proceeds to step 1520. However, if there are no remaining edges then the process proceeds to step 1545 and the process is terminated.

At step 1520, the edge with the smallest weight is identified and selected from grouping graph. For example, edge $e_{34}$ as shown in grouping graph 300 has the smallest weight. It should be noted that in embodiments, the smallest weight is analogous to the smallest distance. One an edge has been selected the process moves to step 1525.

Figure 18:
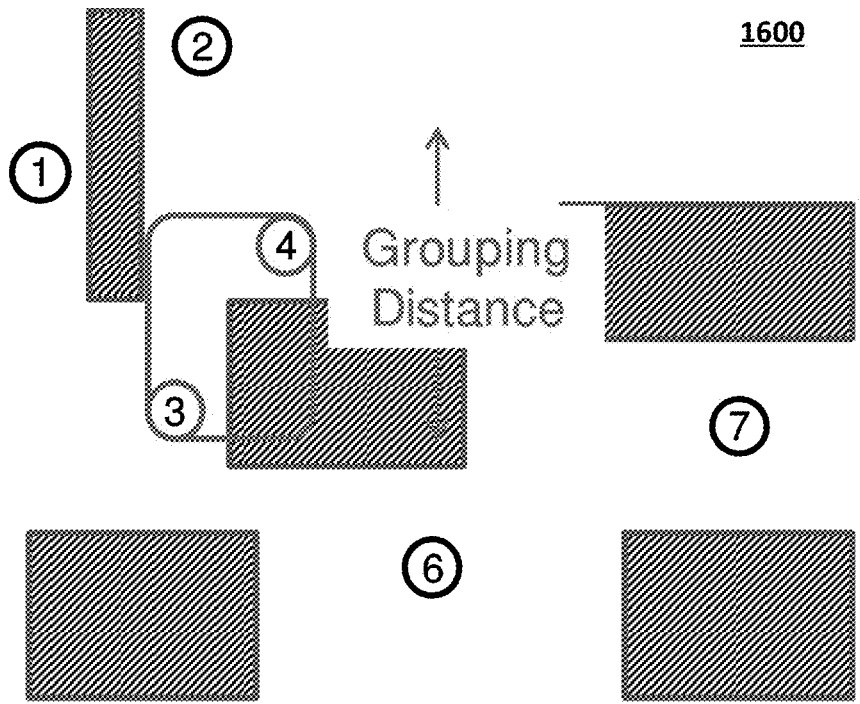
FIG. 18 depicts a simplified plan view of a pin grouping process for a net, in accordance with one or more embodiments of the present invention.

At step 1525, it is determined if a bounding box of the selected edge exceeds the maximum group distance. If it does exceed this maximum distance, then the edge is removed from the graph and the process returns to step 1515. However, if the bounding box does not exceed the maximum grouping distance the process moves to step 1530. The bounding box may be defined as a box that is drawn around two or more corresponding pins. For example, the bounding box around nodes 3 and 4 (which corresponds to edge $e_{34}$) is shown in FIG. 18. In some embodiments, the bounding box may be just large enough to encompass all of the corresponding pins. In other embodiments, the bounding box may be larger than the bounding box that is depicted in FIG. 18. Once the bounding box is established it is compared to the maximum grouping distance.

Figure 19:
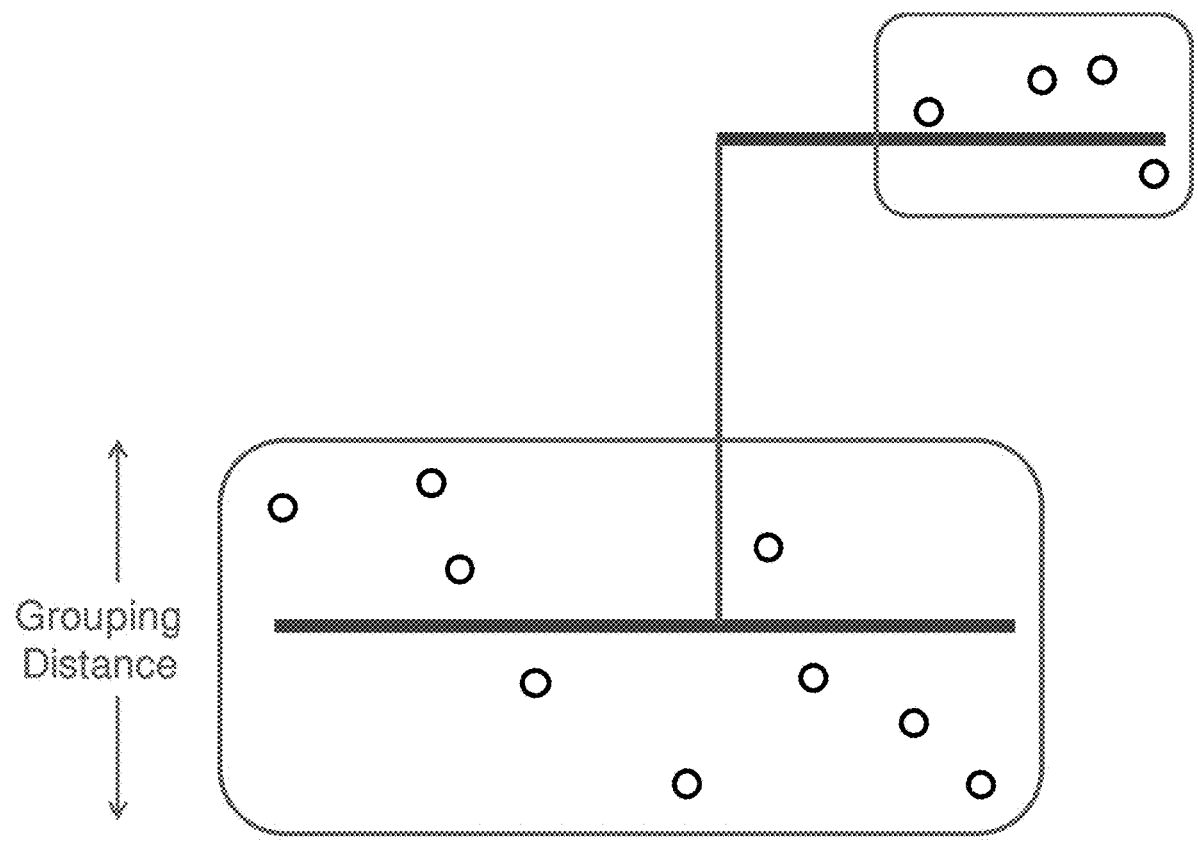
FIG. 19 depicts a simplified plan view of a pin grouping process for a net, in accordance with one or more embodiments of the present invention.

The maximum grouping distance defines how far pins can be apart and still share one spine. This concept is illustrated in FIG. 19. The maximum grouping distance is customizable based on the net design. In some embodiments, the maximum grouping distance may be relatively small as shown in the top portion of FIG. 19. In other embodiments, the maximum grouping distance may be relatively large as shown in the bottom portion of FIG. 19. In some cases, the maximum grouping distance may be determined on a per spine basis, in which, each individual spine has its own grouping distance. In other cases, there may be a universal maximum grouping distance, in which all spines have the same maximum grouping distance. For row-based designs, the row height or double the row height can be used as the maximum grouping distance to group pins in one row or two rows. For row-less-designs, an analysis of cells may be used to find the appropriate grouping distance. As illustrated, in FIG. 18 the bounding box corresponding to edge $e_{34}$ is within the maximum grouping distance as indicated.

Figure 20:
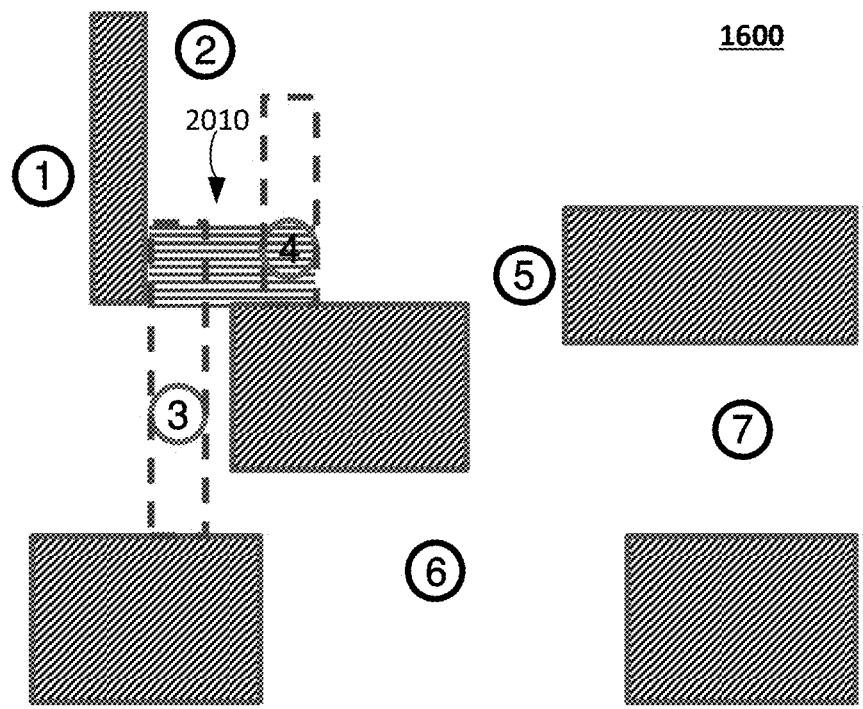
FIG. 20 depicts a simplified plan view of a pin grouping process for a net, in accordance with one or more embodiments of the present invention.
Figure 25:
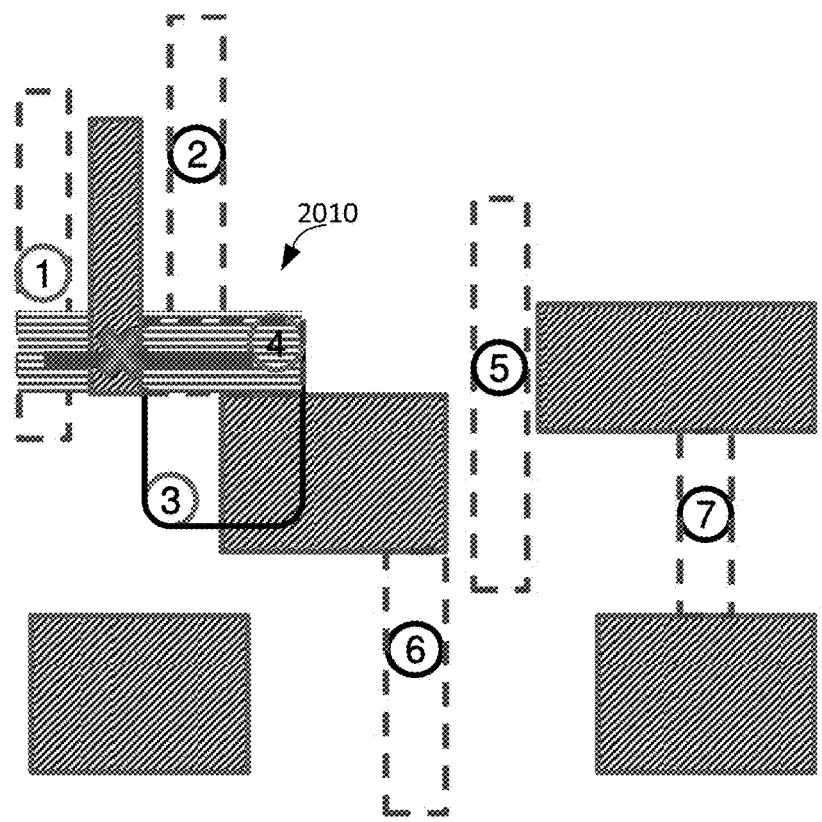
FIG. 25 depicts a simplified plan view of a pin grouping process for a net, in accordance with one or more embodiments of the present invention.

At step 1530, it is determined if there is enough space in the net design placing a main bone wire for the pins corresponding to the selected edge. If there is not enough space to place the main bone wire then the edge is removed from the graph and the process proceeds to step 1515. However, if there is enough room to place a bone wire for the pin pairs then the process moves to step 1535. FIG. 20 illustrates an example of determining if there is space to place a bone wire for pins 3 and 4. Region 2010 comprises a plurality of routing resources available to place a main bone wire. A main bone wire can be placed in region 2010 as long as there is not an obstacle in the way. In embodiments, the width (in the Y direction) of the potential main bone wire is compared to the height (in the Y direction) of region 2010, and if the height of region 2010 is greater than the width of the potential main bone wire then the potential bone main wire may be placed in region 2010. FIG. 25 illustrates an example of when there is not enough space in the net design to place a main bone wire. Region 2010 exists for a potential connection between pins 4, 2, 3, and 1. However there is an obstacle in region 2010, so a bone wire cannot be placed in region 2010.

Figure 26A:
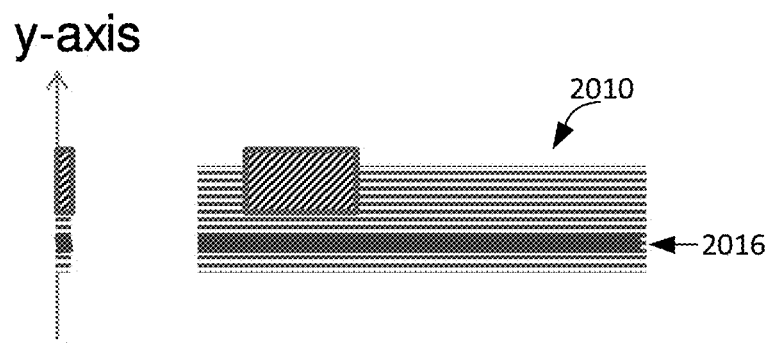
FIG. 26A depicts a simplified plan view of a pin grouping process for a net, in accordance with one or more embodiments of the present invention.
Figure 26B:
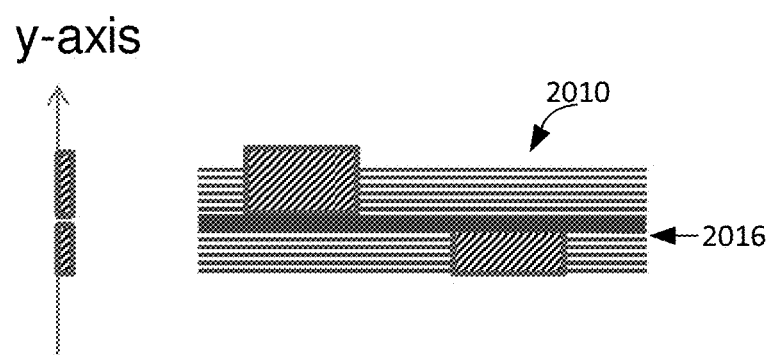
FIG. 26B depicts a simplified plan view of a pin grouping process for a net, in accordance with one or more embodiments of the present invention.

The mere existence of an obstacle in region 2010 does not, on its own, prevent a main bone wire from being placed in region 2010. FIG. 26A illustrates an example of a situation where an obstacle appears in region 2010 but main bone wire 2016 is still able to be placed in the region. The height of region 2010 is greater than the width of main bone wire 2016. In contrast, FIG. 26B illustrates an example of a situation where obstacles in region 2010 prevent main bone wire 2016 from being placed in the region. Although, there is a part of region 2010 that is not blocked by the obstacles the width of the main bone wire 2016 greater than the height of the available area of region 2010. As a result, bone wire 2016 cannot be placed in region 2010.

Figure 21:
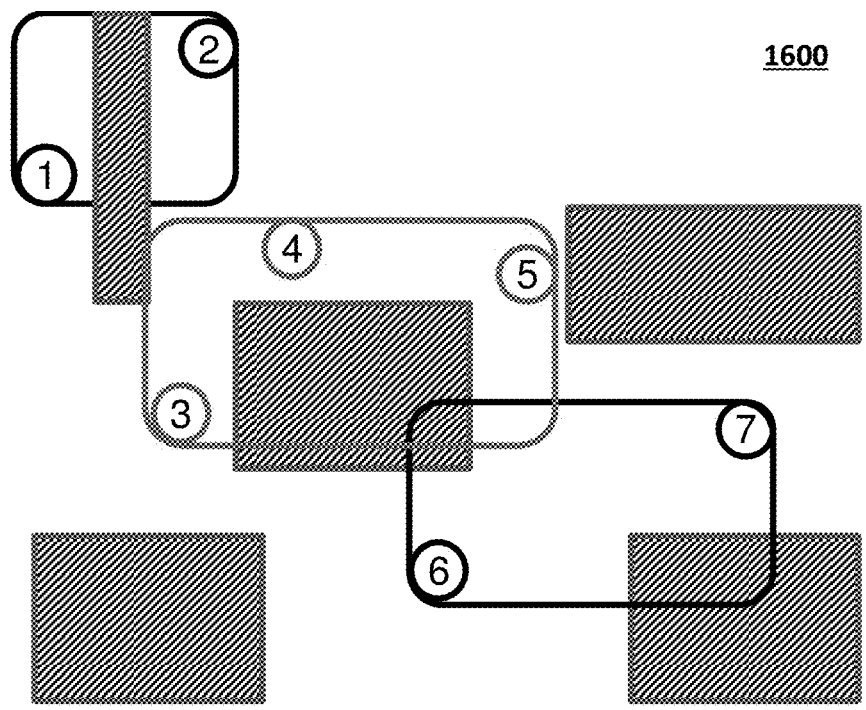
FIG. 21 depicts a simplified plan view of a pin grouping process for a net, in accordance with one or more embodiments of the present invention.

At step 1535, it is determined if the bounding box determined in step 1525 overlaps with another bounding box of another pin group. If there is an overlap the edge is removed from the graph and the process returns to step 1515. However, if there is not an overlap the process proceeds to step 1540. An example of overlapping bounding boxes is shown in FIG. 21. In FIG. 21, a bounding box around pins 6 and 7 has been formed. However, this bounding box overlaps the already established bounding box containing pins 3 4 and 5. As a result edge $e_{67}$ would be removed from the grouping graph.

At step 1540, the two or pins corresponding to the selected edge are grouped together by a bounding box in the net and by a new node on the grouping graph. An example of step 1540 is shown in FIGS. 22A and 22B. In FIG. 22A, edge $e_{34}$ has successfully passed steps 1520-1535 and new node 8 is formed on grouping graph 1700. New node 8 has the combined access ranges of nodes 3 and 4. Thus every node access range that overlaps the access range of nodes 3 and 4 now overlaps with the access range of new node 8. As a result, grouping graph 1700 is updated and edges are formed between node 8 and node 1, node 8 and node 2, and node 8 and node 5. In addition, a bounding box is placed around pins 3 and 4 in net 1600. After step 1540, the process proceeds back to step 1515.

Figure 7B:
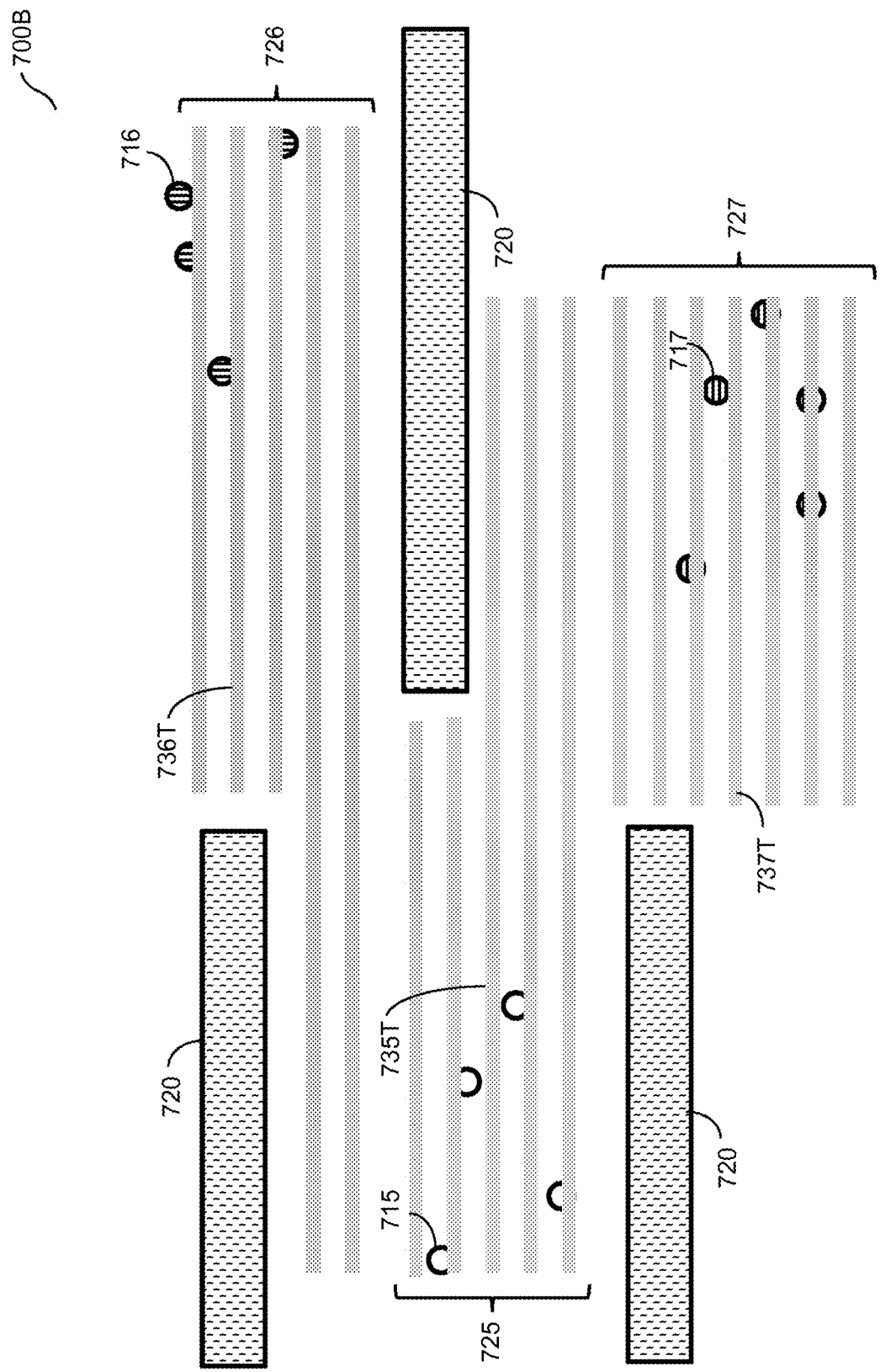
FIG. 7B depicts a simplified plan view of a wire routing example using multiple main spine wires for routing a net after estimating available tracks associated with main spines, in accordance with one embodiment of the present invention.

FIG. 7B depicts a simplified plan view of a wire routing example 700B using multiple main spine wires for routing a net after estimating or selecting 630 available horizontal M2 tracks 725, 726, 727 associated with main spines, in accordance with one embodiment of the present invention. Recall that wires are constrained to run in available tracks that are not blocked by blockages. Thus, available tracks are potential locations that wires may be placed. Thus, the multitude of available horizontal M2 routing tracks 725, 726, 727 are available for placement of main spine wires. However, no wires have been placed yet at this stage in the method.

Referring to FIGS. 6 and 7B, the multitude of available horizontal M2 routing tracks 725, 726, 727 may be partitioned according to the locations of the nearest groups of partitioned pins. For example, the multitude of horizontal M2 routing tracks 725, 726, 727 may be associated with respective ones of the multitude of partitioned groups of pins 715, 716, 717. In other words, the multitude of available horizontal M2 routing tracks 725 may be associated with the first group of pins 715, the multitude of available horizontal M2 routing tracks 726 may be associated with the second group of pins 716, and the multitude of available horizontal M2 routing tracks 727 may be associated with the third group of pins 717. In one embodiment, the multitude of available horizontal M2 routing tracks 725 is substantially parallel to the multitude of available horizontal M2 routing tracks 726 and 727.

Similarly, a multitude of routing tracks for at least one main branch spine may be estimated at step 630 from a multitude of available vertical M1 routing tracks (not shown) in accordance with a third cost function, and further in accordance with data associated with the multitude of available vertical M1 routing tracks. The data may include the positions of each of the available vertical M1 routing tracks for a given IC design. In one embodiment, a multitude of vertical M1 routing tracks may be estimated to connect all of the selected horizontal M2 routing tracks to obtain a routing solution around blockages or to obtain the optimally shortest total net wire length. In one embodiment, the longitudinal orientation of the multitude of available M1 routing tracks may be substantially orthogonal to the longitudinal orientation of the multitude of available M2 routing tracks. In one embodiment, the third cost function may include a wire length of the selected M1 track. In one embodiment, one or more of the first cost function, the second cost function, and the third cost function are the same.

Figure 7C:
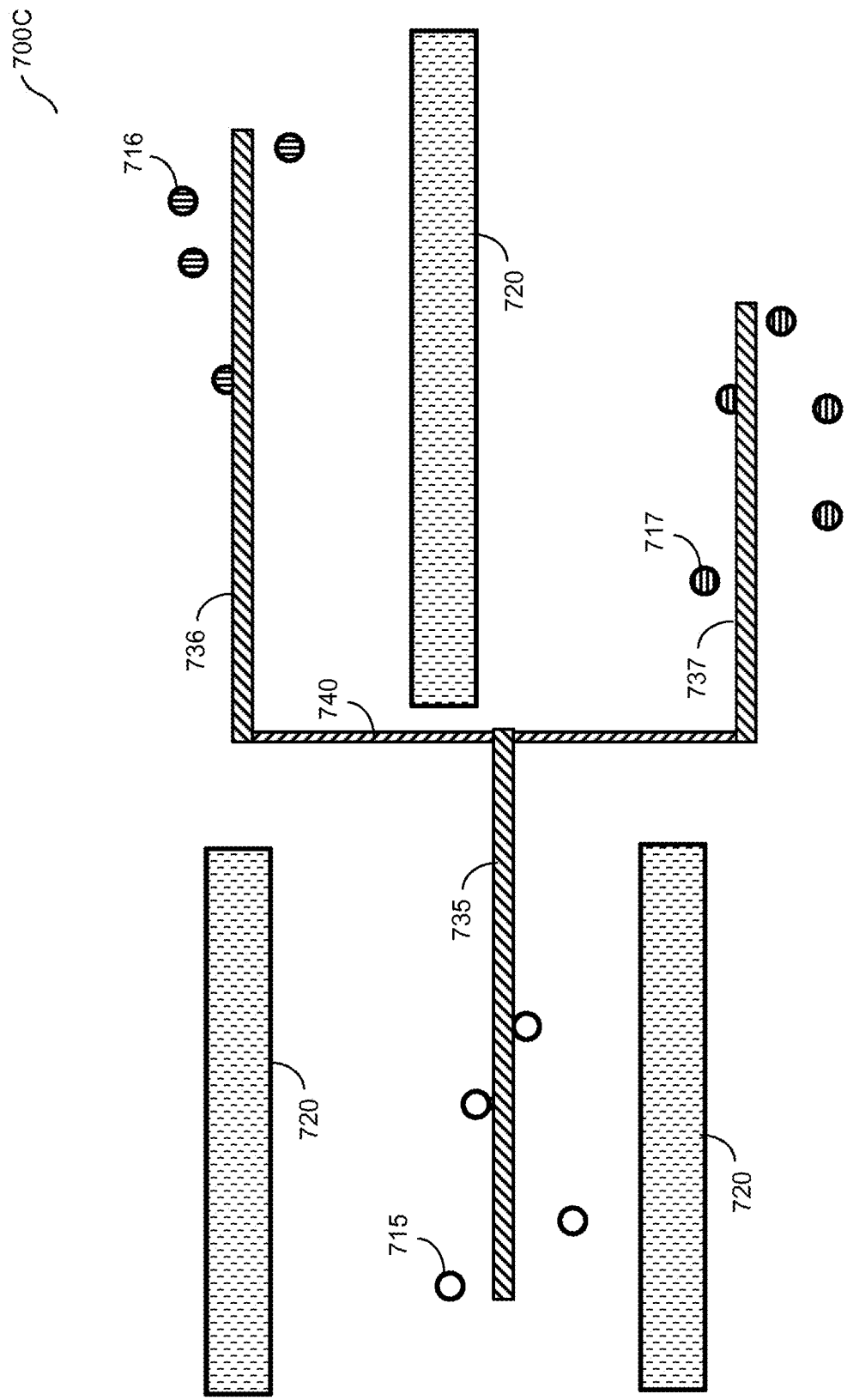
FIG. 7C depicts a simplified plan view of a wire routing example using multiple main spine wires for routing a net after generating main spines and a main branch spine, in accordance with one embodiment of the present invention.

FIG. 7C depicts a simplified plan view of a wire routing example 700C using multiple main spine wires for routing a net after generating 640 main spines 735, 736, 737 and a main branch spine 740, in accordance with one embodiment of the present invention. Referring to FIGS. 6 and 7B-7C, main spines are generated or placed 640 after determining which available tracks to use for each of the multitude of horizontal M2 routing tracks 725, 726, 727. As shown in FIG. 7C, a different main spine wire 735, 736, 737 is generated for each group of pins 715, 716, 717. For example, available horizontal M2 main spine track 735T may be selected to generate horizontal M2 main spine wire 735 associated with the first group of pins 715, available horizontal M2 main spine track 736T may be selected to generate horizontal M2 main spine wire 735 associated with the second group of pins 716, and an available horizontal M2 main spine track 737T may be selected to generate horizontal M2 main spine wire 737 associated with the third group of pins 717.

Similarly, at least one main branch spine is generated or placed 640 by deciding which single available track to use from the multitude of vertical M1 routing tracks (not shown) to generate a vertical M1 main branch spine wire that connects the multitude of generated horizontal M2 main spine wires. For example, an available vertical M1 main branch track (not shown) may be selected to generate vertical M1 main branch spine wire 740 to connect together horizontal M2 main spine wires 735, 736, 737.

Figure 7D:
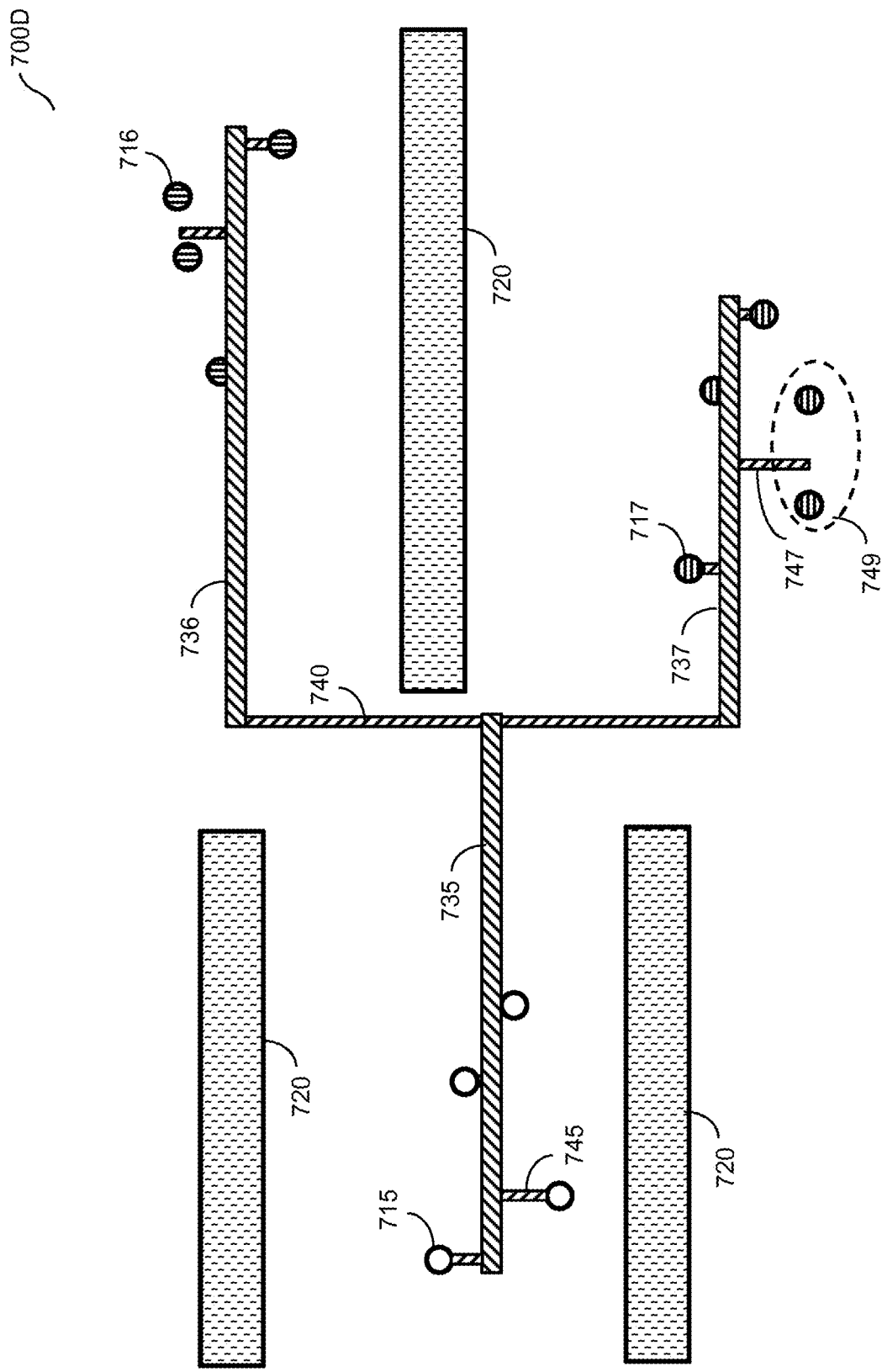
FIG. 7D depicts a simplified plan view of a wire routing example using multiple main spine wires for routing a net after generating at least one branch spine, in accordance with one embodiment of the present invention.

FIG. 7D depicts a simplified plan view of a wire routing example 700D using multiple main spine wires for routing a net after generating 650 at least one branch spine 745, 747, in accordance with one embodiment of the present invention. Referring to FIGS. 6 and 7D, in this embodiment, branch spines are generated by the following actions. For each branch spine, one of the group of pins, is partitioned into a sub-group of pins to connect with the branch spine and another sub-group of pins including the remaining pins of the one group of pins according to a fourth cost function. A vertical M1 spine routing track may then be selected from the multitude of selectable vertical M1 routing tracks (not shown) associated with the one group of pins in accordance with a position of at least one of main spine wires. In the example of FIG. 7D, the third main spine wire 737 may be used to select the selected vertical M1 routing track. A vertical M1 branch spine wire 747 is subsequently generated on the selected vertical M1 spine routing track.

In one embodiment, the selected vertical M1 routing track for vertical M1 branch spine wire 747 is substantially orthogonal to horizontal M2 main spine track 735T and horizontal M2 main spine track 737T. In one embodiment, a vertical M1 branch spine wire 745 is generated such that vertical M1 branch spine wire 745 connects a single pin sub-group to the first main spine wire 735. In this example, the selected vertical M1 routing track is used to connect to the first spine wire 735.

Figure 7E:
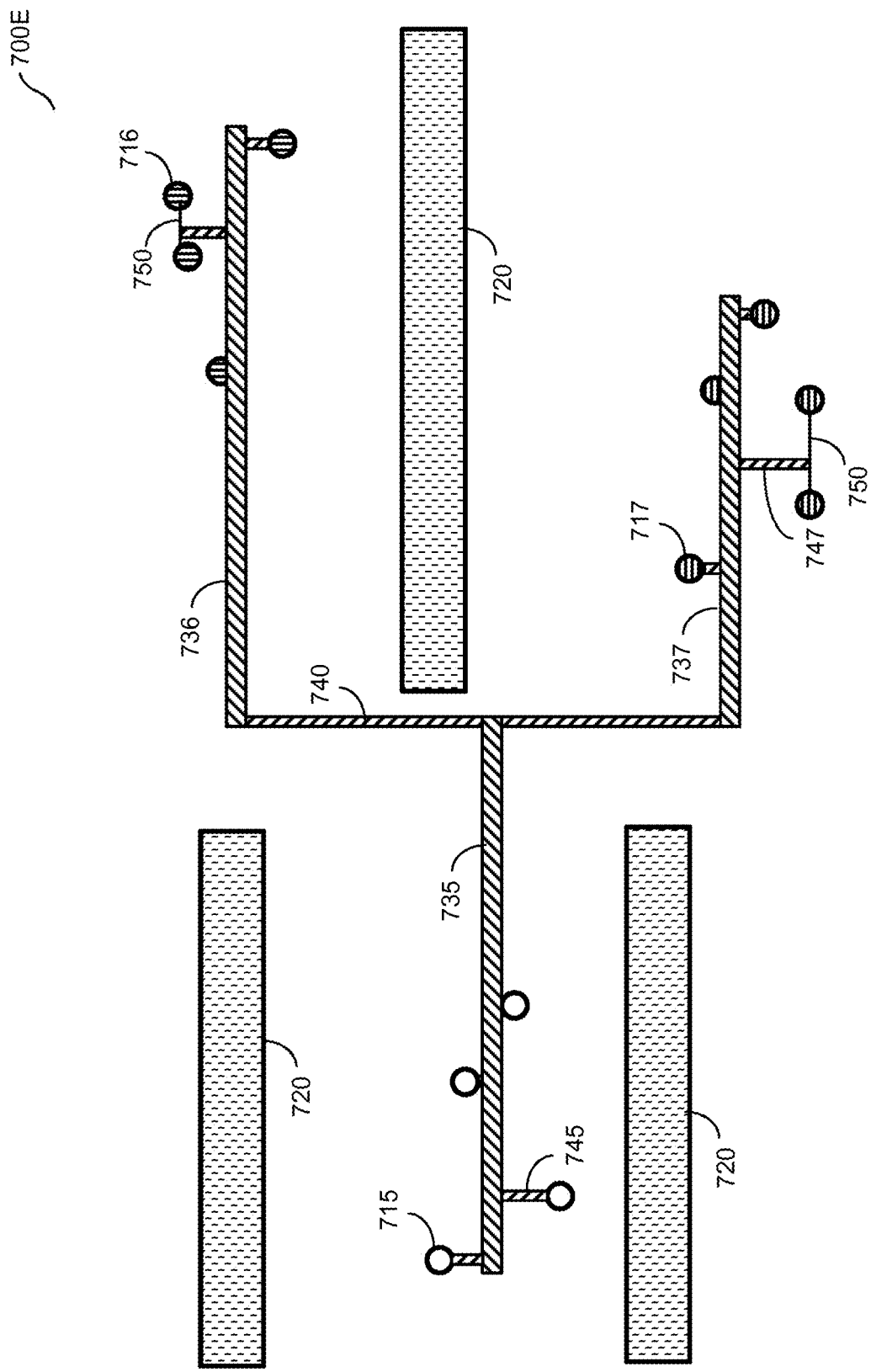
FIG. 7E depicts a simplified plan view of a wire routing example using multiple main spine wires for routing a net after generating wires connecting unconnected pins to their associated branch spine, in accordance with one embodiment of the present invention.

FIG. 7E depicts a simplified plan view of a wire routing example 700E using multiple main spine wires for routing a net after generating wires 750 connecting unconnected pins to their associated branch spine 747, in accordance with one embodiment of the present invention. Referring to FIGS. 6 and 7D, for each sub-group of pins, a wire 750 is generated connecting the unconnected pins to the closest branch spine of that sub-group. In one embodiment, wire 750 is substantially orthogonal to the associated branch spine 747 connected to wire 750.

Figure 8:
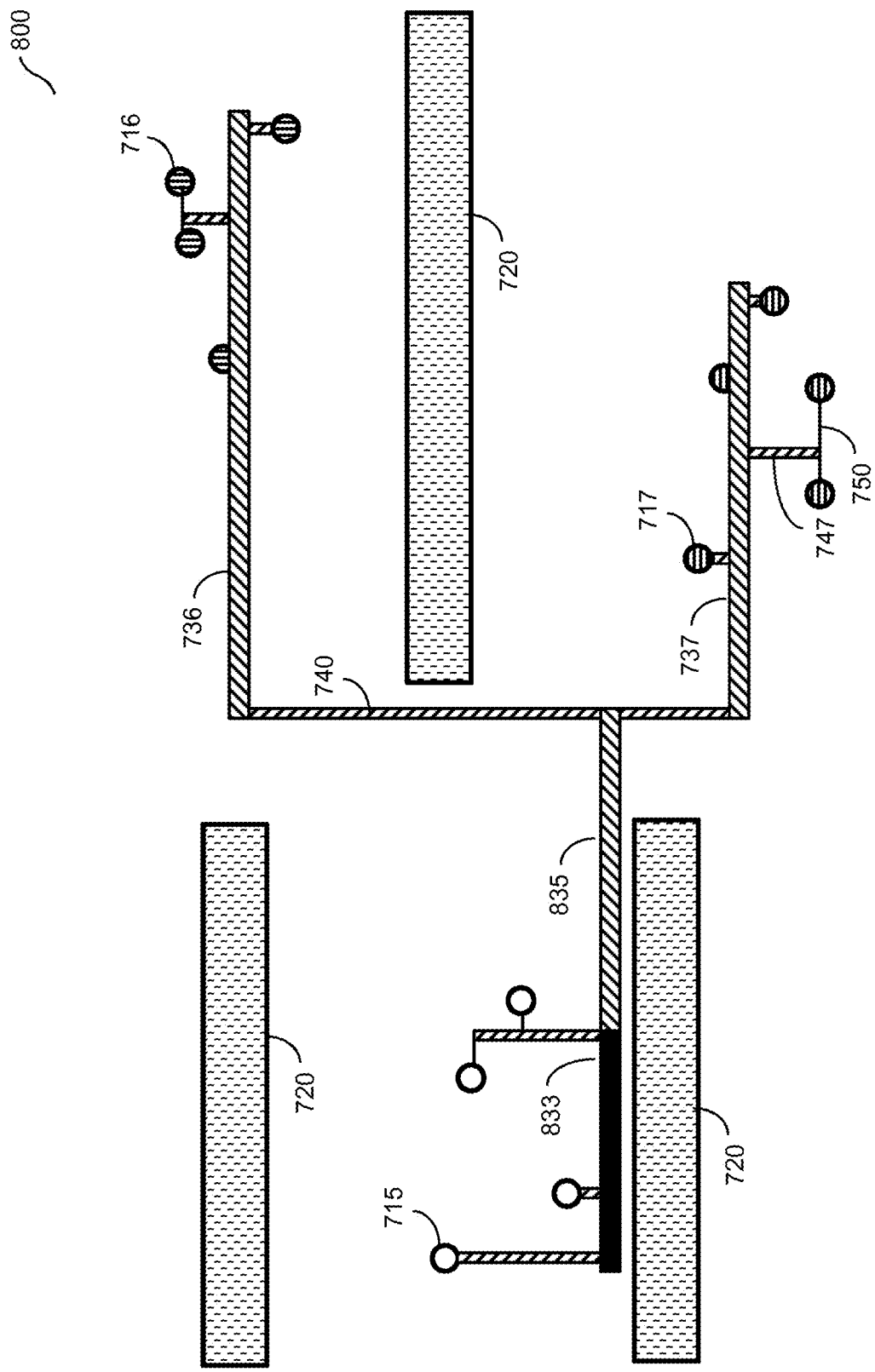
FIG. 8 depicts a simplified plan view of a wire routing example using multiple main spine wires for routing a net using a re-use prewire, in accordance with one embodiment of the present invention.

FIG. 8 depicts a simplified plan view of a wire routing example 800 using multiple main spine wires for routing a net using a re-use prewire 833, in accordance with one embodiment of the present invention. Features depicted in FIG. 8 are similar to the features depicted in FIG. 7E with the following exceptions being noted. In one embodiment, any combination of the first, second and/or third cost functions may include a distance to a predetermined feature of the net. In one embodiment, the predetermined feature of the net may include at least one of a pin, a preexisting wire, or a via that may be placed by the designer in the data associated with the net before the routing is performed. The predetermined feature may be identified such that the presence of the predefined feature triggers and/or instructs the routing process to perform special functions. In one embodiment, the predetermined feature may be a preexisting wire identified as the re-use prewire, e.g. re-use prewire 833 on M2.

In some embodiments, in response to an identification of a re-use prewire 833, the computer uses the first and/or second cost function to select the same horizontal M2 track as used by re-use prewire 833 to generate a horizontal M2 main spine wire 835. For this function, the distance for the cost function associated with the re-use prewire is zero, i.e. the distance from the spine track to be selected and the re-use pre-wire's track is zero. Thus, the track of re-use prewire 833 is "reused" for the horizontal M2 main spine wire 835. Analogously, in one embodiment, a vertical M1 pre-wire may be placed in the net data as a prewire to instruct the routing process to select the M1 pre-wire's routing track for the main branch spine. This feature is useful, for example, if a wire track is used by a previously placed layout cell and it is desired to minimize the use of tracks to conserve routing resources.

FIG. 9A depicts a simplified plan view of a wire routing example 900A using multiple main spine wires for routing without using compact routing, in accordance with one embodiment of the present invention. Wire routing example 900A includes horizontal M2 power or ground wires 910 placed in predetermined positions before or during routing. Wire routing example 900A further includes horizontal M2 main spines 920, 930, and 940, which are placed according to the standard routing process without the special feature of compact routing. Horizontal M2 main spines 920, 930, and 940 may be associated with the same net or different nets.

FIG. 9B depicts a simplified plan view of a wire routing example 900B using multiple main spine wires for routing using compact routing, in accordance with one embodiment of the present invention. Features depicted in FIG. 9B are similar to the features depicted in FIG. 9A with the following exceptions being noted. Wire routing example 900B includes horizontal M2 main spines 922, 942 which correspond to horizontal M2 main spines 920, 940, respectively, except the process is run with the added cost function constraint that any combination of the first, second and/or third cost functions includes a distance to a predetermined feature of another net. In the depicted example, spine wires of a same metal layer are compacted. As shown, horizontal M2 main spines 922, 942 are placed in selected tracks next to horizontal M2 main spine 930. In this example, the feature is any other selected track on the same metal layer and the distance in the cost function may be the closest adjoining track on the same metal layer. This compact routing feature may be useful for situations where additional space is desirable, for example, to place other components or interconnections after running the routing process.

FIG. 9C depicts a simplified plan view of a wire routing example 900C using multiple main spine wires for routing using compact routing to a power/ground line, in accordance with one embodiment of the present invention. Features depicted in FIG. 9C are similar to the features depicted in FIG. 9B with the following exceptions being noted. Wire routing example 900C includes horizontal M2 main spines 920, 932, 944 which respectively correspond with horizontal M2 main spines 922, 930, 942, respectively, except the process is run with the added cost function constraint that the predetermined feature may be any power or ground wires on the same metal layer. Accordingly, the horizontal main spine wires 920, 932, 944 are placed preferentially in tracks adjacent the horizontal M2 power or ground wires 910. This feature may help isolate noise transmission between wires by using adjacent power or ground lines as electromagnetic shielding.

In some embodiments, the computer may receive information indicating that a particular net is to be routed with low resistance. In response to the indication, the computer may automatically cause the net to be routed with low resistance connections. For example, in response to the information, the computer may reduce the length or increase the width of wires. In some embodiments, in response to the information, the computer is configured to generate more than one main spine wire for a single group of pins to be connected therewith. In some embodiments, the information includes an indication of which layer of metal to use for a main spine wire, in response to which, the computer causes the main spine wire to be routed with the indicated layer. The information may, for example, be provided to the computer in a description of the circuit to be routed.

FIG. 10A depicts a simplified plan view of a wire routing example 1000A using multiple horizontal M2 main spine wires 1032, 1036 for routing a group of pins of a net using loop routing, in accordance with one embodiment of the present invention. Wire routing example 1000A includes blockages 1020 analogous to blockages 720 depicted in FIG. 7A, horizontal M2 main spine wire 1036 analogous to horizontal M2 main spine wire 736, and vertical M1 main branch spine wire 1040 analogous to vertical M1 main branch spine wire 740 depicted in FIG. 7C. As depicted in FIG. 10A during routing, the computer may select an additional horizontal M2 main spine track from the multitude of M2 routing tracks associated with a group of pins. The computer then generates additional horizontal M2 main spine wire 1032 on the selected additional horizontal M2 main spine track. Vertical M1 main branch spine wire 1040 may be connected to the additional horizontal M2 main spine wire 1032 by an extension 1040B to the vertical M1 main branch spine wire 1040 as depicted in more detail in FIG. 10B. In some embodiments, an additional vertical main branch spine wire (not shown) is additionally generated, where the additional vertical main branch spine wire is also connected to main spine wires 1032, 1036.

In some embodiments, the computer fills the gap or at least a portion of the gap between the main spine wires 1032, 1036 with a wire (not shown). In some embodiments, the computer fills the gap or at least a portion of the gap between main branch spine wire 1040 and the additional vertical main branch spine wire with a wire (not shown).

FIG. 10B depicts a detailed portion 1000B of the wire routing example 1000A of an example using multiple horizontal M2 main spine wires 1032, 1036 for routing a net using loop routing depicted in FIG. 10A, in accordance with one embodiment of the present invention. Detailed portion 1000B includes M1/M2 vias 1050 that connect vertical M1 main branch spine wire 1040 and extension 1040B to one of the two longitudinal ends of horizontal M2 main spine wire 1036 and additional horizontal M2 main spine wire 1032. As shown, main branch spine wire 1040 forms a parallel connection of a multitude of horizontal M2 main spine wires. This provides improved performance and reliability for the net. Additional horizontal M2 main spine wire 1032 may be formed, for example, in a horizontal M2 spine track adjacent to the wire track selected for horizontal M2 main spine wire 1036 or in a non-adjacent track. Analogously, in another embodiment, main branch spine wire 1040 may be connected to an additional main branch spine wire (not shown). Any additional number of spine wires may be added by the routing process.

In some embodiments, the computer may receive information indicating that a particular net is to be shielded. In response to the indication, the computer may automatically cause the net to be routed with a shielding wire. For example, in response to the information, the computer may generate a shielding wire adjacent to the particular net, where the adjacent shielding wire is connected to a power supply or ground net. In some embodiments, the shielding wire surrounds or substantially surrounds the particular net. The information may, for example, be provided to the computer in a description of the circuit to be routed.

Figure 11:
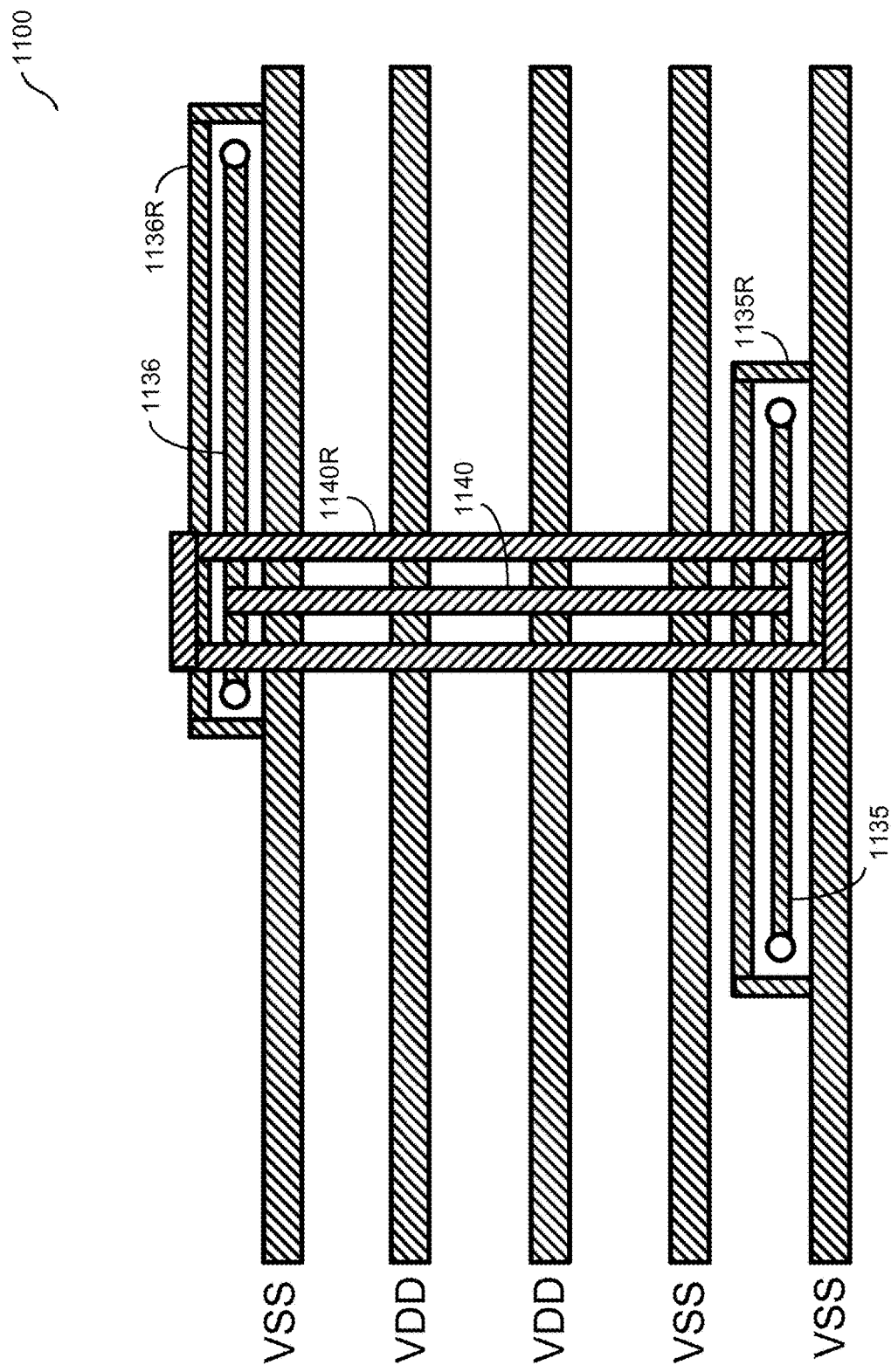
FIG. 11 depicts a simplified plan view of a wire routing example multiple main spine wires for routing a net using shield routing, in accordance with one embodiment of the present invention.

FIG. 11 depicts a simplified plan view of a wire routing example 1100 using multiple main spine wires 1135, 1136, 1140 for routing a net using shield routing, in accordance with one embodiment of the present invention. The M1 layer is shown overlying the M2 layer to better describe the embodiments in the figure. However, it is understood that the M1 layer is below the M2 when deposited on the IC. As described above, routing a spine wire adjacent to another wire on the same metal layer may provide electromagnetic shielding. The shielding may be further improved by partially or completely surrounding a spine wire with additional wires placed in adjacent tracks. The additional wires, may, for example, be connected to another net such as power or ground. Wire routing example 1100 further includes M2 ring wires 1135R, 1136R that respectively shield horizontal M2 main spine wires 1135, 1136, and includes M1 ring wire 1140R that shields vertical M1 main branch spine wire 1140. In this example, M2 ring wires 1135R, 1136R and M1 ring wire 1140R may be connected to ground (VSS) by vias (not shown). The spines of the net may thus be completely surrounded by shielding wires when the routing process is run automatically. Alternatively, partially shielding the net spines may be nearly as effective and may be provided by adding shielding wires in parallel adjacent tracks to the spine wires without using fully enclosing ring shield wires.

In some embodiments, the computer may receive information indicating that a particular net is to be connected to one or more circuit cell pins at more than one pin location. In response to the indication, the computer may automatically cause the net to be connected with the circuit at multiple pin locations. For example, in response to the information, the computer may generate a wire for the net extending across the circuit cell such that the generated wire crosses multiple pin locations of the circuit cell. The computer may additionally generate vias or contacts at intersections of the generate wire and the pin locations. The information may, for example, be provided to the computer in a description of the circuit to be routed.

Figure 12A:
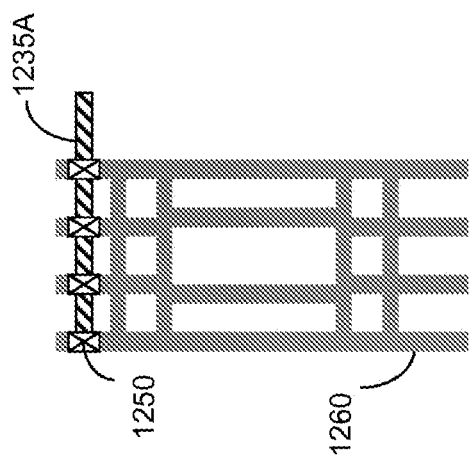
FIG. 12A depicts a simplified plan view of wire routing examples using one of the multiple main spine wires for routing a net using finger pin connection routing, in accordance with one embodiment of the present invention.
Figure 12B:
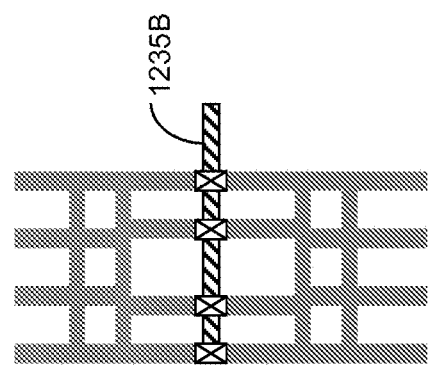
FIG. 12B depicts a simplified plan view of wire routing examples using one of the multiple main spine wires for routing a net using finger pin connection routing, in accordance with one embodiment of the present invention.

FIGS. 12A-12B depict a simplified plan view of wire routing examples using one of the multiple main spine wires 1235 for routing a net using finger pin connection routing, in accordance with one embodiment of the present invention. In one embodiment, any combination of the first, second and/or third cost functions may include a resistivity of an interconnect layer. In some circuit cells, such as in memory cell designs, there may be interconnect layers, such as polysilicon or diffusion with higher resistivity than metal spine layers. The pin connection layer of such a circuit cell corresponds with portions of the cell to which wires may be routed to electrically connect the circuit cell with other circuits. As shown in FIGS. 12A and 12B, the computer may automatically extend or route one of the main spine wires 1235 to extend over the circuit cell such that the main spine wire may be connected to pin connection layer 1260 at multiple locations. Because the low resistance main spine wire connects to the circuit cell at multiple locations, at least a portion of the internal high resistance interconnect layers is shunted by the main spine wire. Contacts or vias 1250 may be added by the computer at locations where the main spine wire 1235 overlaps the pin connection layer 1260. The overlap regions where contacts or vias are to be placed are automatically spaced apart to meet the corresponding spacing design rules for contact or vias.

FIG. 12A depicts one embodiment of the present invention where main spine wire 1235A overlaps the pin connection layer 1260 close to an end of the circuit cell. FIG. 12B depicts one embodiment of the present invention where main spine wire 1235B overlaps the pin connection layer 1260 close to a middle region of the circuit cell.

Figure 13A:
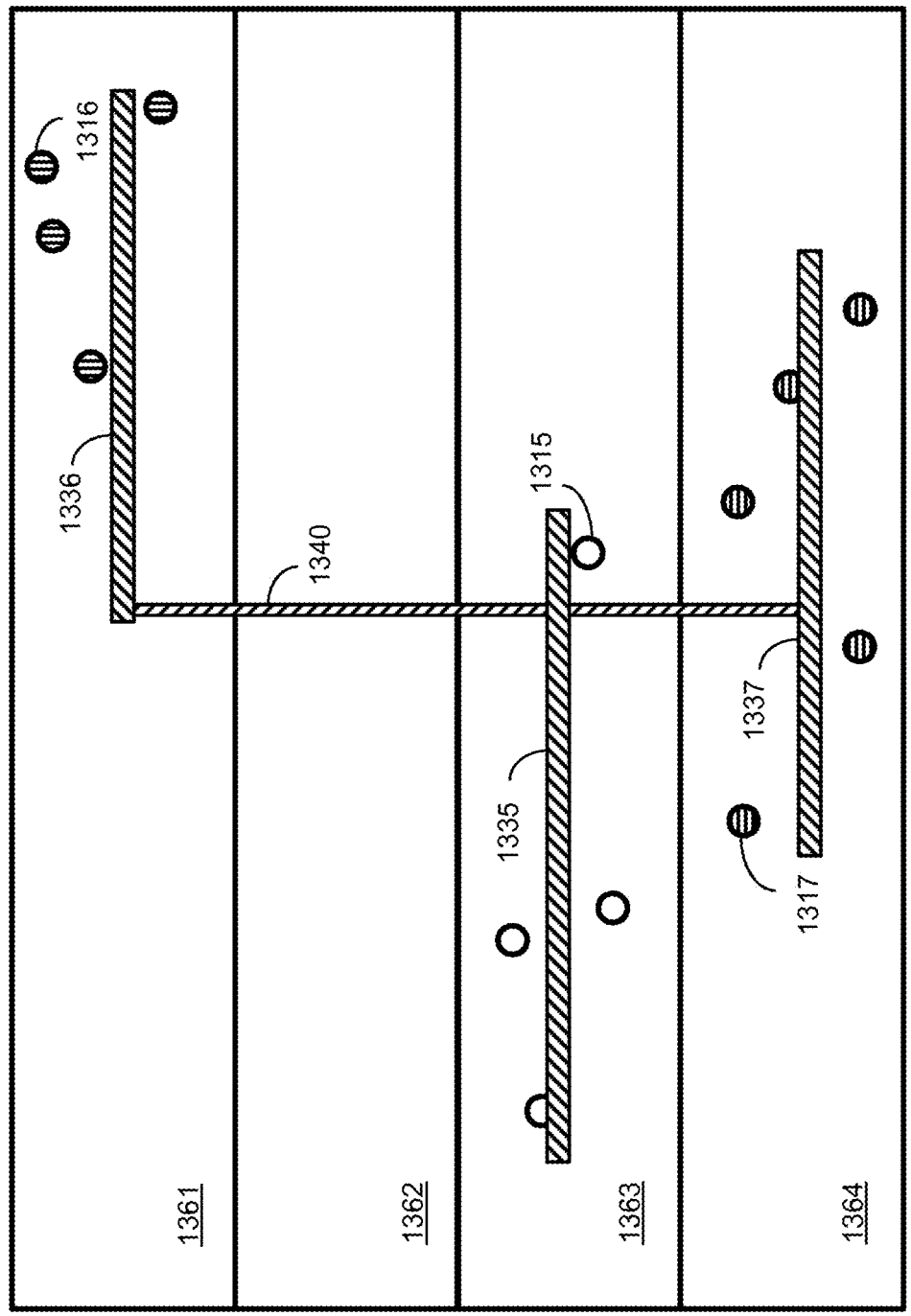
FIG. 13A depicts a simplified plan view of wire routing example using a first exemplary constraint for partitioning pins of the net into groups associated with main spine wires, in accordance with one embodiment of the present invention.

FIG. 13A depicts a simplified plan view of wire routing example 1300A using a first exemplary constraint for partitioning pins of the net into a multitude of groups 1315, 1316, 1317 each associated with a different one of the multitude of main spine wires 1335, 1336, 1337 respectively, in accordance with one embodiment of the present invention. During standard-cell placement before routing, a multitude of cell-placement rows 1361, 1362, 1363, 1364 may be defined and the standard-cells or other layout cell types may be placed according to these rows. Each row defines an area or region where standard-cells may be placed. The use of such cell-placement rows may be called row-based design. Standard-cells may include various circuit components such as transistors, resistors, capacitors, or other components including connection pins for routing a net thereto. Standard-cells or other layout cell types not placed in cell-placement rows may be placed anywhere on the design, called row-less-based design.

During or in preparation for routing the design, for example, during net decomposition, the pins of a net may be partitioned (e.g., step 620 depicted in FIG. 6) into groups according to a cost function, which may include a rule associated with one or more constraints. For row-based designs, the cost function may include the multitude of cell-placement rows. One constraint may be that pins of the net are partitioned into a group according to an associated row of the multitude of cell-placement rows. Thus, the multitude of groups 1315, 1316, 1317 may each be partitioned according to a different one of the associated multitude of cell-placement rows 1361, 1363, 1364. Accordingly, each of the multitude of groups 1315, 1316, 1317 is associated with a different one of the multitude of main spine wires 1335, 1336, 1337. As a result, because pins on a same row share a corresponding same spine, this type of pin partitioning may be called one-row one-spine. For example, the pins of group 1315 may be partitioned into group 1315 from the multitude of pins of the net as a result of being located in cell-placement row 1363, and group of pins 1316 may be partitioned into group 1316 from the multitude of pins of the net as a result of being located in cell-placement row 1361.

Figure 13B:
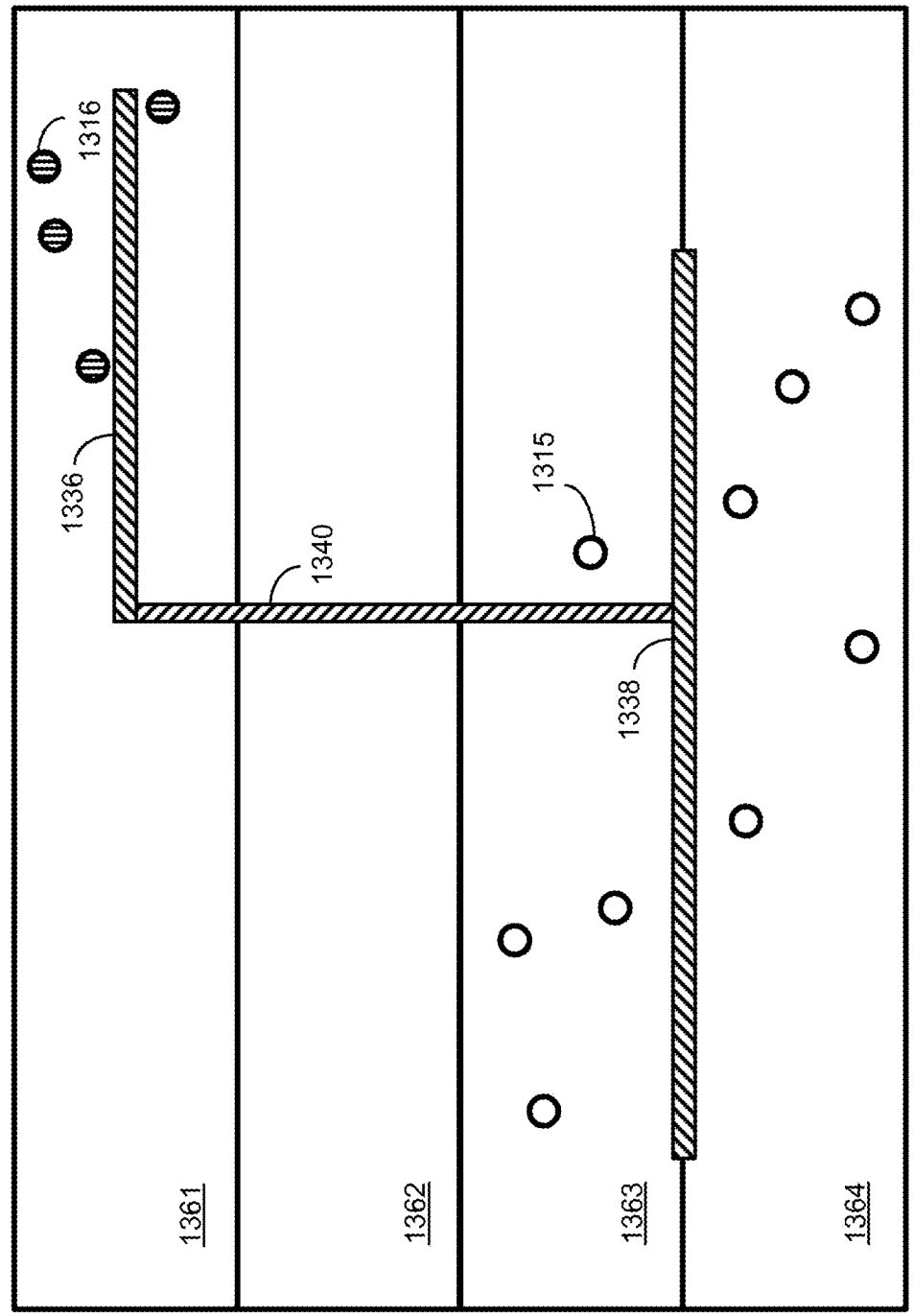
FIG. 13B depicts a simplified plan view of wire routing example using a second exemplary constraint for partitioning pins of the net into groups associated with main spine wires, in accordance with one embodiment of the present invention.

FIG. 13B depicts a simplified plan view of wire routing example 1300B using a second exemplary constraint for partitioning pins of the net into groups 1315, 1316 associated with main spine wires, in accordance with one embodiment of the present invention. FIG. 13B depicts similar features as those depicted in FIG. 13A with the following exceptions being noted. For row-based designs, the constraint may be that pins of the net are partitioned into groups according to an adjacent rows of the cell-placement rows. Thus, the multitude of groups 1315, 1316 may each be partitioned according to a different one of the pairs of cell-placement rows 1361-1362, 1363-1364. Each of the groups 1315, 1316 is associated with a different one of the multitude of main spine wires 1336, 1338. As a result, because pins on a same pair of rows share a same corresponding main spine wire, this type of pin partitioning may be called two-row one-spine. For example, the pins of group 1315 may be partitioned into group 1315 from the multitude of pins of the net as a result of being located in cell-placement row pair 1363-1364, and the pins of group 1316 may be partitioned into group 1316 from the multitude of pins of the net as a result of being located in cell-placement row 1361-1362.

In this two-row one-spine example, because the group of pins 1315 is evenly distributed between cell-placement rows 1362 and 1364, the computer selects a track for routing main spine 1338 that is located close to the intersection of cell-placement rows 1362 and 1364. However, because the group of pins 1316 is distributed within cell-placement row 1361, the computer selects a track for routing main spine 1336 that is located within that same cell-placement row 1361. It is understood that the computer may additionally use other constraints, such as total wire length and blockage locations, to partition groups of pins. Further, the computer may use total wire length and blockage locations along with any combination of one-row one-spine or two-row one-spine constraints.

Figure 13C:
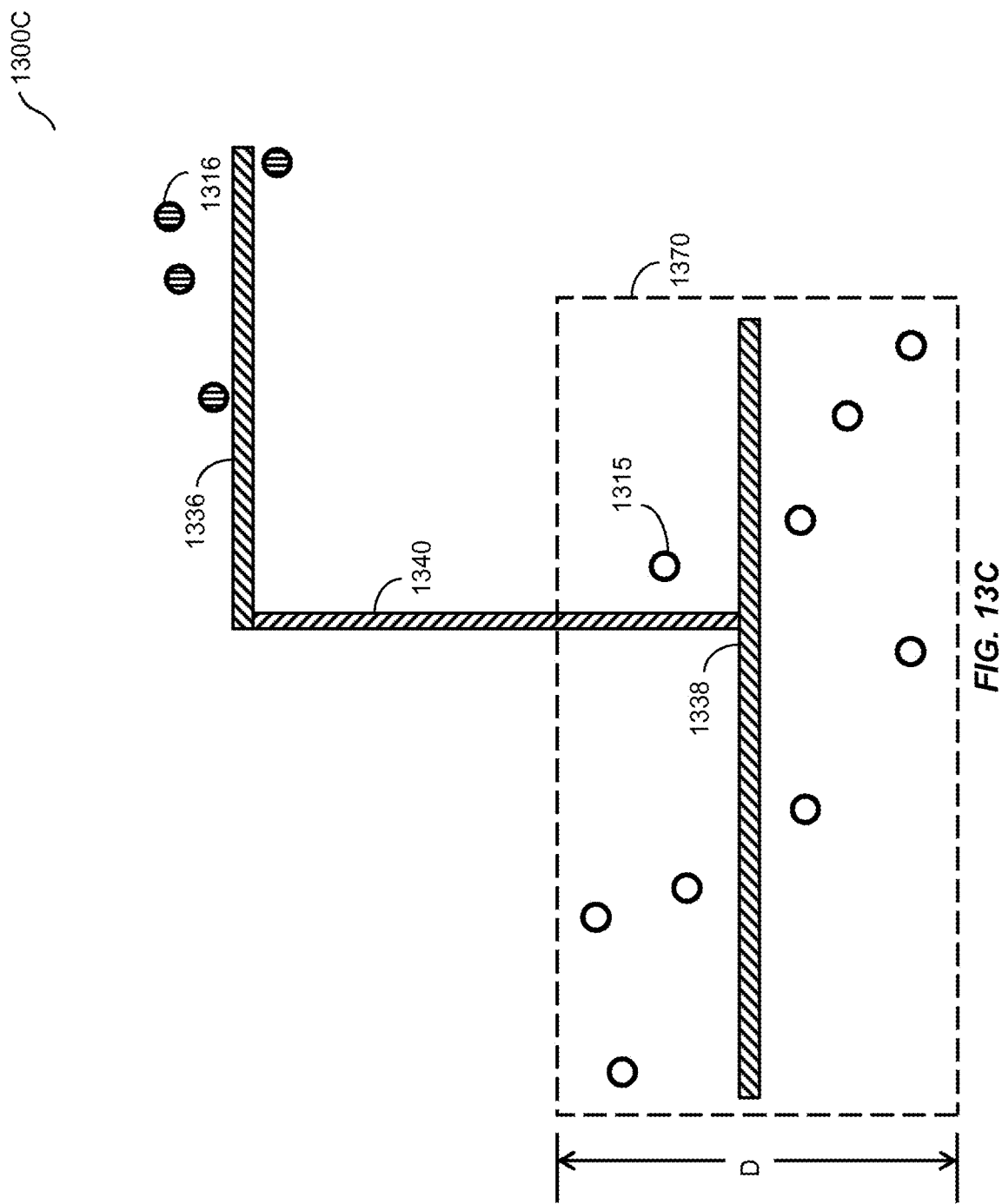
FIG. 13C depicts a simplified plan view of wire routing example using a third exemplary constraint for partitioning pins of the net into groups associated with main spine wires, in accordance with one embodiment of the present invention.

FIG. 13C depicts a simplified plan view of wire routing example 1300C using a third exemplary constraint for partitioning pins of the net into groups 1315, 1316 associated with main spine wires 1338, 1336, respectively, in accordance with one embodiment of the present invention. FIG. 13C depicts similar features as those depicted in FIG. 13B with the following exceptions being noted. For either row-based designs (not shown) or for row-less-based designs, one constraint may be that pins of the net are partitioned into a group according to a predefined distance, D. In one embodiment D is defined in the direction orthogonal to the longitudinal axis of one of the main spine wires, 1338. In one embodiment, D is defined as the maximum length of one edge of a rectangular region enclosing a group of pins. Thus, the multitude of groups 1315, 1316 may be partitioned according to a rectangular box 1370 having one side of length D perpendicular to the direction of main spine wire 1338. Pins enclosed by rectangular box thousand 370 are partitioned into group of pins 1350. Pins not enclosed by rectangular box 1370 are partitioned into group of pins 1316. Each of the multitude of groups 1315, 1316 may be associated with a different one of the multitude of main spine wires 1336, 1338. In one embodiment, the computer similarly constrains the length of branch spines (not shown) to be roughly D/2.

Figure 14:
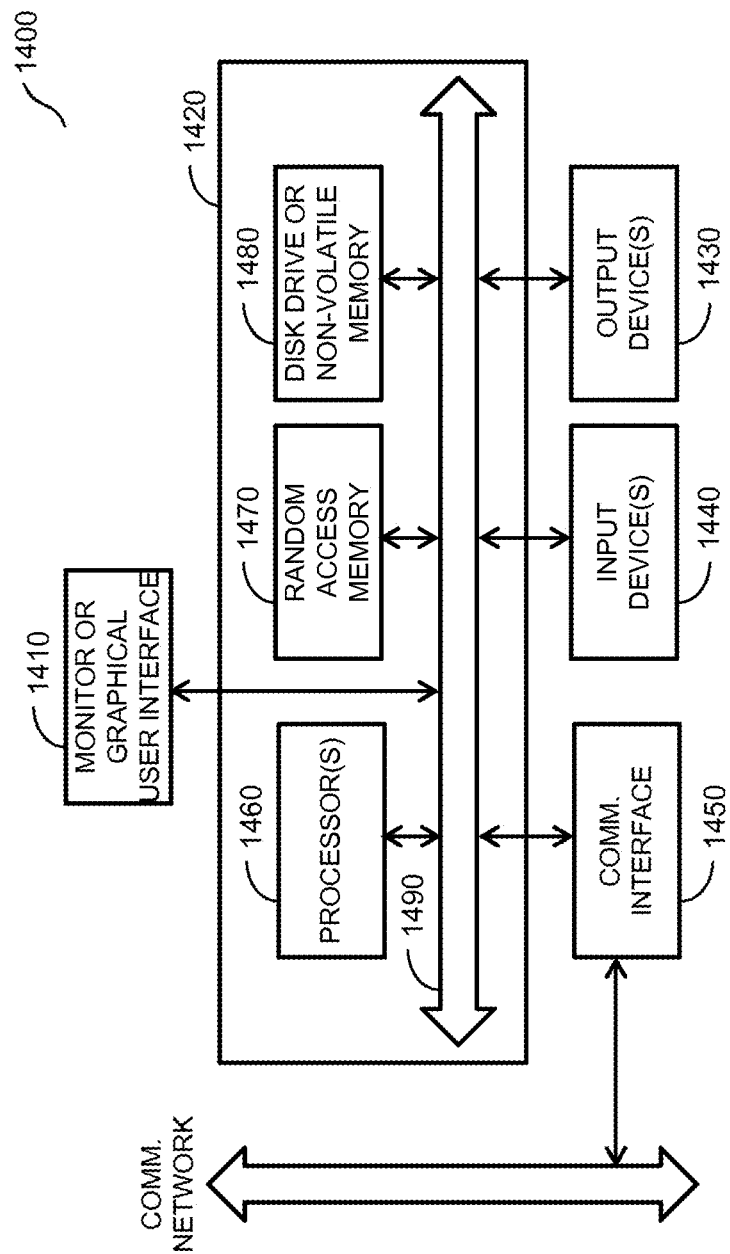
FIG. 14 is a block diagram of a computer system that may incorporate embodiments of the present invention.

FIG. 14 is a simplified block diagram of a computer system that may incorporate aspects and features of the disclosed embodiments of the present invention. FIG. 14 is merely illustrative of an embodiment incorporating the present invention and does not limit the scope of the invention as recited in the claims. One of ordinary skill in the art would recognize other variations, modifications, and alternatives.

In one embodiment, computer system 1400 typically includes a monitor 1410, a computer 1420, user output devices 1430, user input devices 1440, communications interface 1450, and the like.

As shown in FIG. 14, computer 1420 may include a processor(s) 1460 that communicates with a number of peripheral devices via a bus subsystem 1490. These peripheral devices may include user output devices 1430, user input devices 1440, communications interface 1450, and a storage subsystem, such as random access memory (RAM) 1470 and disk drive 1480.

User input devices 1430 include all possible types of devices and mechanisms for inputting information to computer system 1420. These may include a keyboard, a keypad, a touch screen incorporated into the display, audio input devices such as voice recognition systems, microphones, and other types of input devices. In various embodiments, user input devices 1430 are typically embodied as a computer mouse, a trackball, a track pad, a joystick, wireless remote, drawing tablet, voice command system, eye tracking system, and the like. User input devices 1430 typically allow a user to select objects, icons, text and the like that appear on the monitor 1410 via a command such as a click of a button or the like.

User output devices 1440 include all possible types of devices and mechanisms for outputting information from computer 1420. These may include a display (e.g., monitor 1410), non-visual displays such as audio output devices, etc.

Communications interface 1450 provides an interface to other communication networks and devices. Communications interface 1450 may serve as an interface for receiving data from and transmitting data to other systems. Embodiments of communications interface 1450 typically include an Ethernet card, a modem (telephone, satellite, cable, ISDN), (asynchronous) digital subscriber line (DSL) unit, FireWire interface, USB interface, and the like. For example, communications interface 1450 may be coupled to a computer network, to a FireWire bus, or the like. In other embodiments, communications interfaces 1450 may be physically integrated on the motherboard of computer 1420, and may be a software program, such as soft DSL, or the like.

In various embodiments, computer system 1400 may also include software that enables communications over a network such as the HTTP, TCP/IP, RTP/RTSP protocols, and the like. In alternative embodiments of the present invention, other communications software and transfer protocols may also be used, for example IPX, UDP or the like.

In some embodiment, computer 1420 includes one or more Xeon microprocessors from Intel as processor(s) 1460. Further, one embodiment, computer 1420 includes a UNIX-based operating system.

RAM 1470 and disk drive 1480 are examples of tangible media configured to store data such as embodiments of the present invention, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like. RAM 1470 and disk drive 1480 may be configured to store the basic programming and data constructs that provide the functionality of the present invention.

Software code modules and instructions that provide the functionality of the present invention may be stored in RAM 1470 and disk drive 1480. These software modules may be executed by processor(s) 1460. RAM 1470 and disk drive 1480 may also provide a repository for storing data used in accordance with the present invention.

RAM 1470 and disk drive 1480 may include a number of memories including a main random access memory (RAM) for storage of instructions and data during program execution and a read only memory (ROM) in which fixed instructions are stored. The instructions may be readable by the processor(s) 1460 and may, when executed, cause the computer to perform the various actions described in the embodiments discussed herein. RAM 1470 and disk drive 1480 may include a file storage subsystem providing persistent (non-volatile) storage for program and data files. RAM 1470 and disk drive 1480 may also include removable storage systems, such as removable flash memory.

Bus subsystem 1490 provides a mechanism for letting the various components and subsystems of computer 1420 communicate with each other as intended. Although bus subsystem 1490 is shown schematically as a single bus, alternative embodiments of the bus subsystem may utilize multiple busses.

FIG. 14 is representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other microprocessors are contemplated, such as Pentium™ or Itanium™ microprocessors; Opteron™ or AthlonXP™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

Various embodiments of the present invention can be implemented in the form of logic in software or hardware or a combination of both. The logic may be stored in a computer readable or machine-readable storage medium as a set of instructions adapted to direct a processor of a computer system to perform a set of steps disclosed in embodiments of the present invention. The logic may form part of a computer program product adapted to direct an information-processing device to perform a set of steps disclosed in embodiments of the present invention. Based on the disclosure and teachings provided herein, a person of ordinary skill in the art will appreciate other ways and/or methods to implement the present invention.

The specification and drawings are, accordingly, to be regarded in an illustrative rather than a restrictive sense. However, it will be evident that various modifications and changes may be made thereunto without departing from the broader spirit and scope of the invention as set forth in the claims. In addition, the technique and system of the present invention is suitable for use with a wide variety of EDA tools and methodologies for designing, testing, and/or manufacturing integrated circuits or other electronic devices. The scope of the invention should, therefore, be determined not with reference to the above description, but instead should be determined with reference to the pending claims along with their full scope or equivalents.

What is claimed is:

1. A computer implemented method of routing a net of an electronic circuit layout, the method comprising:
   selecting, using the computer, first and second routing tracks, said second routing track being parallel to said first routing track;
   generating, using the computer, a first spine wire on the selected first routing track and a second spine wire on the selected second routing track, said second spine wire being parallel to said first spine wire;
   selecting, using the computer, third and fourth routing tracks, said third and fourth tracks being parallel to said first and second routing tracks;
   generating, using the computer, a third spine wire on the selected third routing track and a fourth spine wire on the selected fourth routing track, said third and fourth spine wires being parallel to said first and second spine wires;
   generating, using the computer, an electrical connection between the first and third spine wires;
   generating, using the computer, an electrical connection between the second and fourth spine wires; and
   partitioning, using the computer, a plurality of pins of a net into first and second groups of pins in accordance with a first cost function.

2. The method of claim 1, wherein the first and second routing tracks are selected in accordance with a second cost function.

3. The method of claim 1, wherein the plurality of pins of the net are partitioned based on the locations of the pins.

4. The method of claim 1, wherein the plurality of pins of the net are partitioned such that the locations of the pins of each group are within a single standard cell row.

5. The method of claim 1, wherein the plurality of pins of the net are partitioned such that the locations of the pins of each group are within a set of adjacent standard cell rows.

6. The method of claim 1, wherein the plurality of pins of the net are partitioned such that the locations of the plurality of pins of each group are within a predetermined distance of a routing track associated with the group.

7. A computer implemented method of routing a net of an electronic circuit layout, the method comprising:
    selecting, using the computer, first and second routing tracks, said second routing track being parallel to said first routing track;
    generating, using the computer, a first spine wire on the selected first routing track and a second spine wire on the selected second routing track, said second spine wire being parallel to said first spine wire;
    selecting, using the computer, third and fourth routing tracks, said third and fourth tracks being parallel to said first and second routing tracks;
    generating, using the computer, a third spine wire on the selected third routing track and a fourth spine wire on the selected fourth routing track, said third and fourth spine wires being parallel to said first and second spine wires;
    generating, using the computer, an electrical connection between the first and third spine wires; and
    generating, using the computer, an electrical connection between the second and fourth spine wires, wherein the first and second routing tracks are respectively selected based on locations of a plurality of pins of first and second groups of pins.

8. A computer implemented method of routing a net of an electronic circuit layout, the method comprising:
    selecting, using the computer, first and second routing tracks, said second routing track being parallel to said first routing track;
    generating, using the computer, a first spine wire on the selected first routing track and a second spine wire on the selected second routing track, said second spine wire being parallel to said first spine wire;
    selecting, using the computer, third and fourth routing tracks, said third and fourth tracks being parallel to said first and second routing tracks;
    generating, using the computer, a third spine wire on the selected third routing track and a fourth spine wire on the selected fourth routing track, said third and fourth spine wires being parallel to said first and second spine wires;
    generating, using the computer, an electrical connection between the first and third spine wires;
    generating, using the computer, an electrical connection between the second and fourth spine wires; and
    generating a branch connecting the first and second spine wires.

9. A computer implemented method of routing a net of an electronic circuit layout, the method comprising:
    selecting, using the computer, first and second routing tracks, said second routing track being parallel to said first routing track;
    generating, using the computer, a first spine wire on the selected first routing track and a second spine wire on the selected second routing track, said second spine wire being parallel to said first spine wire;
    selecting, using the computer, third and fourth routing tracks, said third and fourth tracks being parallel to said first and second routing tracks;
    generating, using the computer, a third spine wire on the selected third routing track and a fourth spine wire on the selected fourth routing track, said third and fourth spine wires being parallel to said first and second spine wires;
    generating, using the computer, an electrical connection between the first and third spine wires;
    generating, using the computer, an electrical connection between the second and fourth spine wires;
    generating, using the computer, first and second shielding wires parallel to the first spine wire, wherein the first and second shielding wires are connected to a shielding node; and
    generating, using the computer, third and fourth shielding wires parallel to the second spine wire, wherein the third and fourth shielding wires are connected to the shielding node.

10. A router configured to route a net of an electronic circuit layout, wherein the net connects a plurality of pins of the electronic circuit, the router comprising a plurality of instructions stored on a computer readable storage medium which when executed by a computer, causes the computer to:
    select first and second routing tracks, said second routing track being parallel to said first routing track;
    generate a first spine wire on the selected first routing track and a second spine wire on the selected second routing track, said second spine wire being parallel to said first spine wire;
    select third and fourth routing tracks, said third and fourth tracks being parallel to said first and second routing tracks;
    generate a third spine wire on the selected third routing track and a fourth spine wire on the selected fourth routing track, said third and fourth spine wires being parallel to said first and second spine wires;
    generate an electrical connection between the first and third spine wires;
    generate an electrical connection between the second and fourth spine wires; and
    partition a plurality of the pins of a net into first and second groups of pins in accordance with a first cost function.

11. The router of claim 10, wherein the first and second routing tracks are selected in accordance with a second cost function.

12. The router of claim 10, wherein the plurality of pins of the net are partitioned based on the locations of the pins.

13. The router of claim 10, wherein the plurality of pins of the net are partitioned such that the locations of the pins of each group are within a single standard cell row.

14. The router of claim 10, wherein the plurality of pins of the net are partitioned such that the locations of the pins of each group are within a set of adjacent standard cell rows.

15. The router of claim 10, wherein the plurality of pins of the net are partitioned such that the locations of the plurality of pins of each group are within a predetermined distance of a routing track associated with the group.

16. A router configured to route a net of an electronic circuit layout, wherein the net connects a plurality of pins of the electronic circuit, the router comprising a plurality of instructions stored on a computer readable storage medium which when executed by a computer, causes the computer to:
    select first and second routing tracks, said second routing track being parallel to said first routing track;

generate a first spine wire on the selected first routing track and a second spine wire on the selected second routing track, said second spine wire being parallel to said first spine wire;

select third and fourth routing tracks, said third and fourth tracks being parallel to said first and second routing tracks;

generate a third spine wire on the selected third routing track and a fourth spine wire on the selected fourth routing track, said third and fourth spine wires being parallel to said first and second spine wires;

generate an electrical connection between the first and third spine wires;

generate an electrical connection between the second and fourth spine wires, wherein the first and second routing tracks are respectively selected based on locations of a plurality of pins of first and second groups of pins.

17. A router configured to route a net of an electronic circuit layout, wherein the net connects a plurality of pins of the electronic circuit, the router comprising a plurality of instructions stored on a computer readable storage medium which when executed by a computer, causes the computer to:

select first and second routing tracks, said second routing track being parallel to said first routing track;

generate a first spine wire on the selected first routing track and a second spine wire on the selected second routing track, said second spine wire being parallel to said first spine wire;

select third and fourth routing tracks, said third and fourth tracks being parallel to said first and second routing tracks;

generate a third spine wire on the selected third routing track and a fourth spine wire on the selected fourth routing track, said third and fourth spine wires being parallel to said first and second spine wires;

generate an electrical connection between the first and third spine wires;

generate an electrical connection between the second and fourth spine wires; and generate a branch connecting the first and second spine wires.

18. A router configured to route a net of an electronic circuit layout, wherein the net connects a plurality of pins of the electronic circuit, the router comprising a plurality of instructions stored on a computer readable storage medium which when executed by a computer, causes the computer to:

select first and second routing tracks, said second routing track being parallel to said first routing track;

generate a first spine wire on the selected first routing track and a second spine wire on the selected second routing track, said second spine wire being parallel to said first spine wire;

select third and fourth routing tracks, said third and fourth tracks being parallel to said first and second routing tracks;

generate a third spine wire on the selected third routing track and a fourth spine wire on the selected fourth routing track, said third and fourth spine wires being parallel to said first and second spine wires;

generate an electrical connection between the first and third spine wires;

generate an electrical connection between the second and fourth spine wires;

generate first and second shielding wires parallel to the first spine wire, wherein the first and second shielding wires are connected to a shielding node; and generate third and fourth shielding wires parallel to the second spine wire, wherein the third and fourth shielding wires are connected to the shielding node.

* * * * *